(12) United States Patent
Iwasaki

(10) Patent No.: US 11,431,625 B2
(45) Date of Patent: *Aug. 30, 2022

(54) MULTI-FUNCTIONAL CIRCUITRY FOR COMMUNICATIONS NETWORKS AND METHODS AND DEVICES UTILIZING SAME

(71) Applicant: Sean Iwasaki, Chicago, IL (US)

(72) Inventor: Sean Iwasaki, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/839,260

(22) Filed: Apr. 3, 2020

(65) Prior Publication Data

US 2020/0296034 A1  Sep. 17, 2020

Related U.S. Application Data

(63) Continuation of application No. 15/687,862, filed on Aug. 28, 2017, now Pat. No. 10,637,776.

(60) Provisional application No. 62/381,168, filed on Aug. 30, 2016.

(51) Int. Cl.
| | |
|---|---|
| *H04L 45/60* | (2022.01) |
| *H04L 49/109* | (2022.01) |
| *H04L 49/00* | (2022.01) |
| *H04L 49/35* | (2022.01) |

(52) U.S. Cl.
CPC ............ *H04L 45/60* (2013.01); *H04L 49/109* (2013.01); *H04L 49/30* (2013.01); *H04L 49/355* (2013.01)

(58) Field of Classification Search
CPC ....... H04L 45/60; H04L 49/109; H04L 49/30; H04L 49/355
See application file for complete search history.

(56) References Cited

U.S. PATENT DOCUMENTS

| | | | | |
|---|---|---|---|---|
| 5,368,041 A | * | 11/1994 | Shambroom | G16Z 99/00 128/901 |
| 7,636,802 B1 | * | 12/2009 | Baxter | H03K 19/017581 710/33 |
| 10,637,776 B2 | * | 4/2020 | Iwasaki | H04L 49/355 |
| 2007/0086792 A1 | * | 4/2007 | Regev | H04B 10/66 398/209 |
| 2009/0093137 A1 | * | 4/2009 | Badehi | G02B 6/4284 439/55 |
| 2011/0134988 A1 | * | 6/2011 | Chen | H04L 25/03038 375/230 |
| 2011/0191503 A1 | * | 8/2011 | Kakish | G06F 13/10 710/305 |
| 2014/0016479 A1 | * | 1/2014 | Coomber | H04L 43/50 370/252 |
| 2016/0098336 A1 | * | 4/2016 | Loebig | G06F 11/3409 710/16 |

* cited by examiner

*Primary Examiner* — Harry H Kim

(74) *Attorney, Agent, or Firm* — Charles T. Riggs, Jr.

(57) ABSTRACT

The present subject matter relates to methods, circuitry and equipment providing a multi-functional, cost effective, media independent, open platform for communication services using differential signaling interfaces. The methods, circuitry and equipment comprise a plurality of input amplifiers, output amplifiers, and multiplexer switches or resistive dividers, which provide the ability to monitor, provide service protection switching, provide redundant services, provide on-demand service, provide service upgrades, security, test, and troubleshoot any communication devices and services.

20 Claims, 47 Drawing Sheets

MULTI-FUNCTIONAL CIRCUITY FOR COMMUNICATIONS NETWORKS AND METHODS AND DEVICES UTILIZING SAME

BACKGROUND

The telecommunication network is based on numerous standards, which collectively define the framework for an interoperable and reliable telecommunication infrastructure. These standards define the specifications and requirements for the communication services, the equipment used, and their operations. Although these standards have been instrumental in the success of the telecommunication network, the telecommunication network is comprised with an abundance of proprietary equipment and complex network management systems, which require significant costs, time, and effort to manage. Communication equipment is typically design with specific functionality with dedicated media interfaces, such as wired and optical Ethernet. Examples are a Router with five RJ45 Ethernet ports and two optical SC fiber port, or an Ethernet switch with twenty optical LC fiber ports. Although these examples of specific design communication equipment are cost effective, the fixed functionality and dedicated media interfaces cannot address all service applications such as monitoring or TAP, redundancy, on-demand, security and testing or troubleshooting.

Prior art communication equipment used for monitoring services is designed with dedicated media interface, such as wired or optical Ethernet. The telecommunication market is very competitive, which the market demands more cost effective and efficient services. To achieve competitiveness, the telecommunication network must simplify and become a unified platform of services and equipment. The telecommunication network is slowing evolving towards this optimization model. The optimization in services involves standardizing on Ethernet as the telecommunication services. The optimization in equipment is to use commercial off-the shelf (COTS) equipment or white boxes. White boxes are equipment with generic standard hardware, but the equipment functionality is upgradable and provisionable with software. Software defined networks (SDN) and network function virtualization (NFV) provide the framework to achieve this optimization.

Small Form-factor Pluggable (SFP) units are standardized units adapted to be inserted within a chassis. A suite of specifications, produced by the SFF (Small Form Factor) Committee, describe the size of the SFP unit, so as to ensure that all SFP compliant units may be inserted smoothly within one same chassis, i.e. inside cages, ganged cages, superposed cages and belly-to-belly cages. Specifications for SFP units are available at http://www.sffcommittee.com/ie/index.html.

SFP units may be used with various types of exterior connectors, such as coaxial connectors, optical connectors, and various other types of electrical connectors. By way of further background, small form factor pluggable modules are used to provide a flexible means of providing communication services for the telecommunication network. The mechanical form factor and electrical interface are defined by an industry standard multi-source agreement (MSA). The pluggable module is typically deployed on communication network equipment such as an Ethernet switch, a fiber multiplexer, or media converters. SFP transceivers are designed to support optical and wired Ethernet, TDM SONET, Fibre Channel, and other communications standards. Due to its small and portable physical size, SFP's are defined through multisource agreements (MSAs). MSAs are agreements for specifications of pluggable transceivers agreed to by vendors and service providers or users. MSAs allow other vendors to design transceivers to the same specifications reducing risk for vendors and operators, increasing flexibility, and accelerating the introduction of new technology. MSAs for SFP pluggable modules are define for XFP, XPAK, XENPAK, X2, XFP-E, SFP, SFP+, QSFP, QSFP+, and CXP technologies. MSA define the SFP pluggable modules electrical, mechanical, and software characteristics for the applicable functionality, MSA-compliant pluggable transceivers are standardized among equipment vendors and network operators to support multiple sources for pluggable transceivers and interoperability. As such, MSA-compliant SFP pluggable transceivers have become the dominant form of optical transmitters and receivers in the industry.

MSA-compliant SFP pluggable modules ensure product interoperability between various applications and end-equipment. Due to the low cost, size, and interoperability, small pluggable modules are used extensively in all communication service applications (cell backhaul, metro, and core network applications).

Presently, communication equipment using SFP devices prevent the use of other vendors SPF devices. This restriction prevents the Service Provider the ability to use more cost-effective SFP devices. This restriction also prevents the Service Provider from using more available SFP devices, and this restriction can prevent the Service Provider from deploying or restoring services.

In general, different prior art communication equipment can provide different functionality such as monitoring, security, and protection switching. The following prior art references provide general background information regarding the monitoring of communications networks, and each are herein incorporated by reference:

U.S. Pat. No. 5,715,293 entitled Method and Apparatus for Monitoring Telecommunication Signals, issued to Mahoney on Feb. 3, 1998.

U.S. Pat. No. 6,233,613 entitled High Impedance Probe for Monitoring Fast Ethernet LAN Links, issued to Walker et al. on May 15, 2001.

U.S. Pat. No. 6,975,209 entitled In-Line Power Tap Device for Ethernet Data Signal, issued to Gromov on Dec. 13, 2005.

U.S. Patent Publication No. 2006/0159008 entitled System and Method for Monitoring End Nodes Using Ethernet Connectivity Fault Management (CFM) in an Access Network, published to Sridhar, et al. on Jul. 20, 2006.

U.S. Patent Publication No. 2005/0257262 entitled Zero-Interrupt Network Tap, published to Matityahu, et al. on Nov. 17, 2005.

The following prior art reference provides general background information regarding the security of communications networks, and is herein incorporated by reference:

U.S. Pat. No. 8,000,682 entitled Apparatus and Method for Restricting Access to Data, issued to Tischer, et al. on Aug. 16, 2011.

The following prior art references provide general background information regarding protection switching for communications networks, and each are herein incorporated by reference:

U.S. Pat. No. 7,443,789 entitled Protection Switching Mechanism, issued to Glaser, et al. on Oct. 28, 2008.

U.S. Patent Publication No. 2008/0031129 entitled Smart Ethernet Edge Networking System published to Arseneault, et al. on Feb. 7, 2008.

SUMMARY

Multi-functional circuitry for communications networks is provided in cost effective, media independent communication equipment capable of providing the functionality of service monitoring, service protection switching, redundancy, on-demand service, security, testing, troubleshooting and/or service upgrades. The presently disclosed circuitry and equipment provide the ability to provide these various functionalities using small pluggable devices.

The circuitry and equipment of the present disclosure address the optimization of the network by providing an open hardware platform for monitoring services, for providing service protection switching, providing on-demand service delivery services, and other functionality. Media independence is realized by using COTS equipment small form-factor pluggable (SFP) units.

The presently disclosed methods of providing monitoring services using SFP devices allow service monitoring with any desired physical medium. The Service Provider or Customer can monitor services using single-mode fiber, multi-mode fiber, 10/100/1G or 10G wired Ethernet or any other physical medium type. By providing monitoring services with any desired physical medium, this allows the Service Provider or Customer no limitations on distance, and the flexibility to monitor services with any type of equipment and installation.

The methods, circuitry and equipment of the present disclosure provide the functionality of monitoring or tapping, including the ability to:
  monitor or tap any service type.
  monitor or tap any physical media type.
  monitor or tap any connector type.
  monitor or tap the service without interfering with the service.
  monitor or tap the full content and bandwidth of the service.
  monitor or tap the service without any distance limitation.
  monitor or tap the service if the service is not connected.
  provide security when monitoring or tapping the service.
  inject signal into the uplink service with any physical media type.
  inject signal into the downlink service with any physical media type.

The methods, circuitry and equipment of the present disclosure provide the functionality of accessing or cut-through, including the ability to:
  access any service type.
  access any physical media type.
  access any connector type.
  access the full content and bandwidth of the service.
  access the service without any distance limitation.
  access the service if the service is not connected.
  a provide security when accessing the service.

The methods, circuitry and equipment of the present disclosure provide the functionality of redundancy, including the ability to:
  provide redundancy of the uplink path (or path 1) with any media type.
  provide redundancy of the downlink path (or path 2) with any media type.
  provide redundancy of both paths with any media or connector types.
  provide monitoring of the secondary path during uplink path (or path 1) redundancy (i.e. during a protection switch operation).
  provide monitoring of the secondary path during downlink path (or path 2) redundancy (i.e. during a protection switch operation).
  provide cut-thru of the secondary path during uplink path (or path 1) redundancy (i.e. during a protection switch operation).
  provide monitoring of the cut-thru secondary path during downlink path (or path 2) redundancy (i.e. during a protection switch operation).

The methods, circuitry and equipment of the present disclosure provide on-demand functionality, including the ability to:
  provide on-demand service from a monitoring, cut-through, or redundancy operation.
  provide on-demand service with any media type.

The methods, circuitry and equipment of the present disclosure provide the functionality of security, including the ability to:
  limit access to the communications network service to approved devices.
  limit access to the communications network service to approved users.

The methods, circuitry and equipment of the present disclosure provide flexibility in providing the communications network service, including the ability to:
  provide service for any media type or mix of media types wire, coax, fiber, or wireless services.
  extend wireline, fiber, or wireless services.

DETAILED DESCRIPTION

Figure 1:
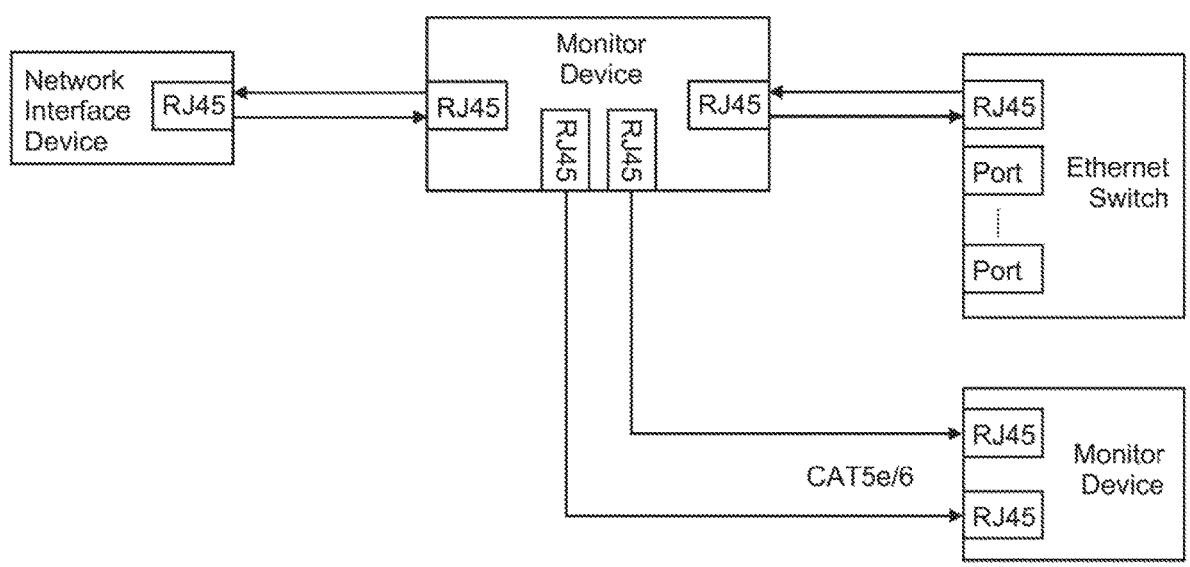
FIG. 1 is a schematic diagram illustrating the use of prior art monitoring equipment designed to monitor communications network service.

The methods, circuitry and equipment of the present disclosure are based on a circuit architecture comprising a plurality of input amplifiers, output amplifiers, and multiplexer switches. The number of input amplifiers, output amplifiers, and multiplexer switches are determined from the number of differential signal paths. The circuitry and equipment of the present disclosure comprises an open hardware platform using COTS equipment small form-factor pluggable (SFP) units.

The methods, circuitry and equipment of the present disclosure also provide the ability to monitor, provide protection switching and redundant services, provide on-demand service, provide service upgrades, security, test, and troubleshoot any devices and services. Accordingly, a multi-functional and cost effective open platform for communication services using small pluggable form factor (SFP) devices, integrated circuits with SERDES interfaces, or any other devices, equipment, or integrated circuits using differential signaling interfaces, is provided herein. This open platform will not restrict the use of Service Providers' SFP devices for providing communication services.

The methods, circuitry and equipment of the present disclosure allow the user flexibility to tap and access communication services using any physical medium such as a wire, wireless, fiber, or coax medium. Thus the user may require any specific medium for monitoring or other communication services. The user will also have the flexibility to use any interface connector type for monitoring and accessing communication services. Thus the user may require any specific interface connector for monitoring and accessing communication services.

Accordingly, the methods, circuitry and equipment of the present disclosure provide numerous advantages, novel features and/or improvements in providing various communication services for communication networks, including but not limited to providing the functionality of service monitoring, service protection switching, redundancy, on-demand service, security, testing, troubleshooting and/or service upgrades. Discussed below and shown in the drawings are some of these advantages, novel features and/or improvements. Additional advantages, novel features and/or improvements will become apparent to those skilled in the art upon examination of the disclosure herein and the accompanying drawings, or may be learned by production or operation of the examples.

The methods, circuitry and equipment of the present disclosure provide this ability and functionality in a manner which is media independent. As such, the methods, circuitry and equipment of the present disclosure are suitable for use in instances where the user may require specific cable mediums and cable interface connectors to monitor or perform other services due to service application or installation.

Figure 2:
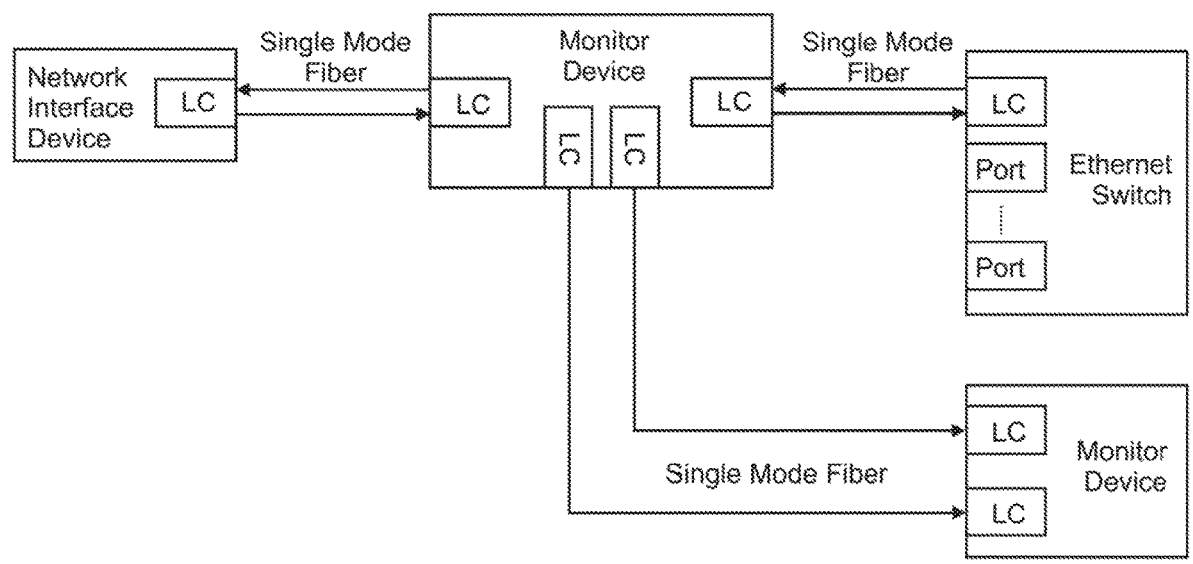
FIG. 2 is a schematic diagram illustrating the use of alternate prior an monitoring equipment designed to monitor communications network service.
Figure 3:
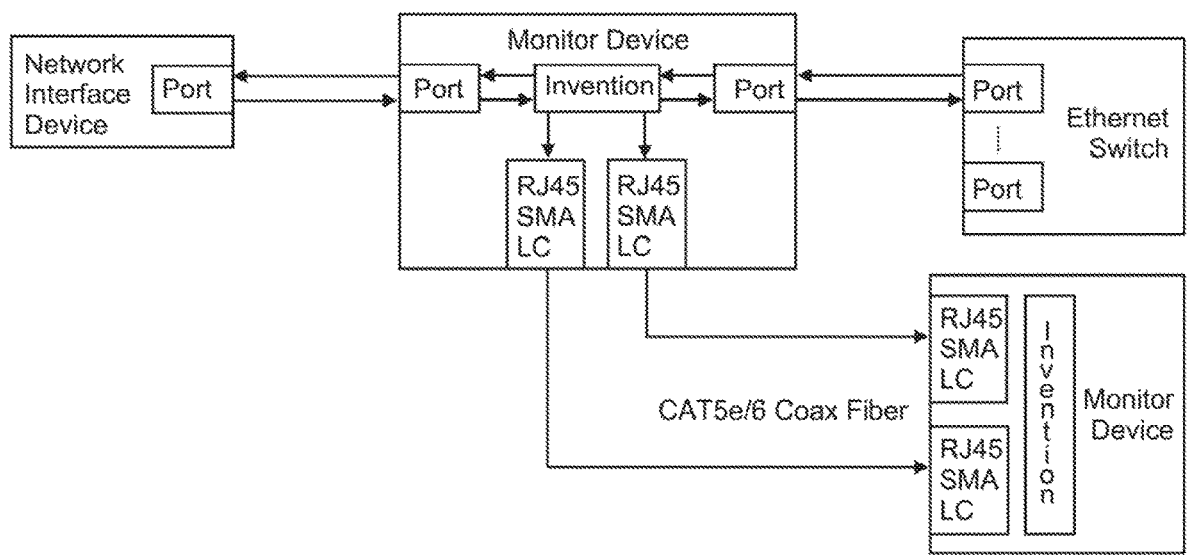
FIG. 3 is a schematic diagram illustrating an embodiment of the communication equipment of the present disclosure providing monitoring functionality.

Referring to FIGS. 1 and 2, as illustrated, prior art devices are designed to monitor service using a fixed connector type; RJ45 jack, LC fiber connector, or SMA coax connector, FIG. 1 (Prior Art). This prior art equipment is also designed to monitor service using fixed connection mediums, such as Cat5e, Cat6, multi-mode fiber, single-mode fiber, or RG59 coax cables, FIG. 2 (Prior Art). For example, the user monitoring the service may only have equipment with fiber connections. If the monitoring equipment has a dedicated wire interface, the user must media convert the wired to fiber interface. However, there are no such limitations with respect to the methods, circuitry and equipment of the present disclosure, and no such conversions would be necessary. As illustrated in FIG. 3, the methods, circuitry and devices of the present disclosure allow monitoring of services using any media type and connections, as SFP ports are provided such that the user can insert an appropriate SFP unit having any desired or required external connector.

Figure 4:
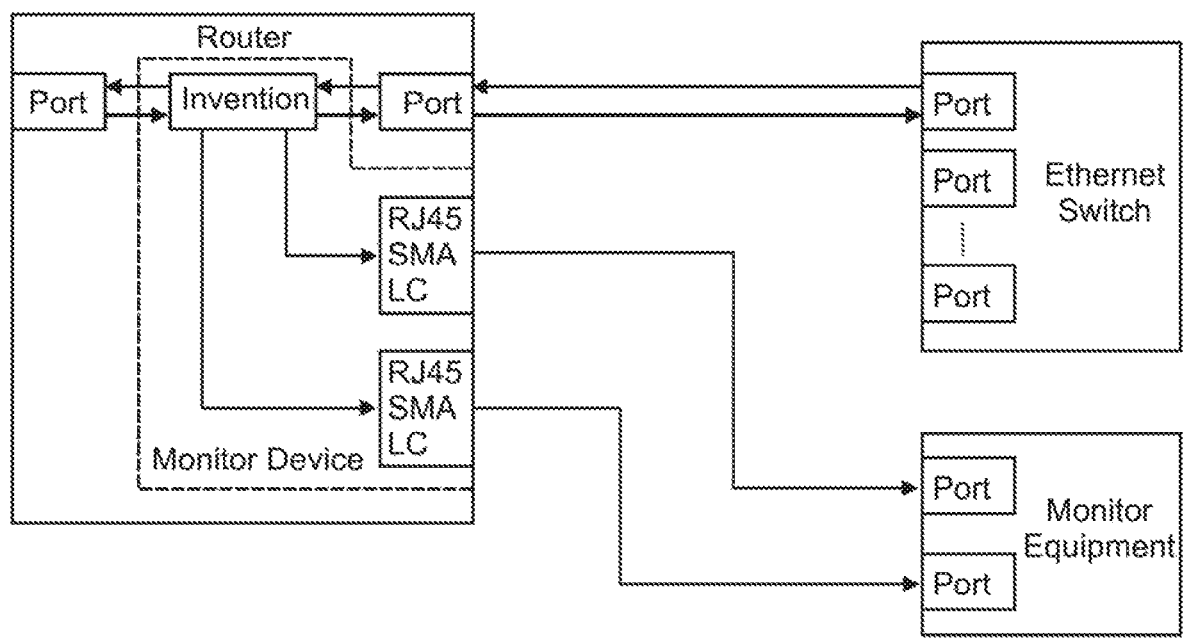
FIG. 4 is a schematic diagram illustrating an alternate embodiment of the communication equipment of the present disclosure providing monitoring functionality.

Use of the prior art monitoring equipment shown in FIGS. 1 and 2 involves the added cost of purchasing and installing expensive monitoring equipment, or dedicated monitoring circuitry must be connected with existing communication equipment. The circuitry of the present disclosure can be easily integrated into other communication equipment such as a Network Interface Device (NID), Router, or Ethernet Switch, which would allow any such equipment to monitor services cost effectively. For example, FIG. 4 is a schematic illustration of the circuitry of the present disclosure integrated into a router. In addition to cost savings, integration of the presently disclosed circuitry into other communications equipment may be beneficial where the installation location or area is space restricted, such that the user may not be able to install additional monitoring equipment.

Figure 5:
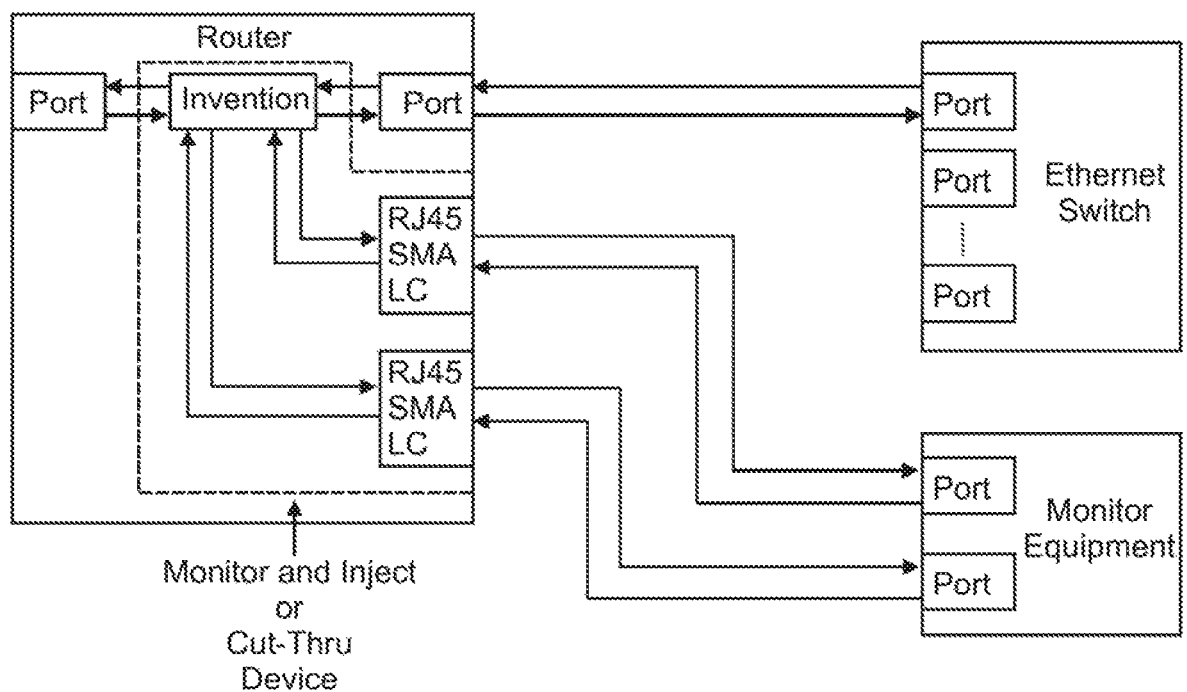
FIG. 5 is a schematic diagram illustrating, the alternate embodiment of the communication equipment of FIG. 4 providing cut-through functionality.

FIG. 5 is a schematic diagram of the circuitry of the present disclosure integrated into a router, and illustrating the additional functionality of providing the ability for the user to cut-through and fully access the communication service. In this embodiment, the cut-through function allows the user to transmit and receive signals for testing and other service operation and maintenance functions.

Figure 6:
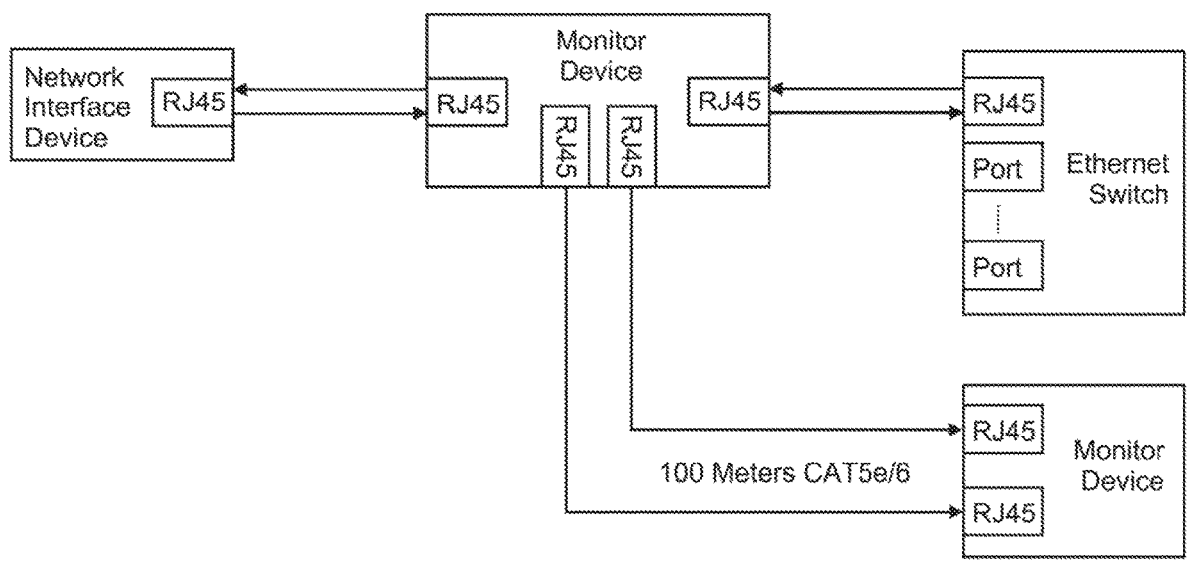
FIG. 6 is a schematic diagram illustrating distance limitations of the prior art monitoring equipment of FIG. 1.

Additionally, certain applications may require monitoring equipment to be located an appropriate distance away from the transport equipment. Privacy, security, and convenience are examples of such applications. If the monitoring equipment is designed using a short distance fiber connector, a fiber splitter, or RJ45 Ethernet, the monitoring equipment must be located within the distance limitation of the monitored service connection. As such, the user may require monitoring services at a specific distance. For example, if the monitoring equipment is designed using RJ45 Ethernet connector, the monitoring equipment must be located within 100 meters of the monitoring service, as illustrated in FIG. 6 (Prior Art). Because of its open platform, the methods, circuitry and equipment of the present disclosure will allow the user to monitor and access services at any distance the user requires, without any distance limitation.

Figure 7:
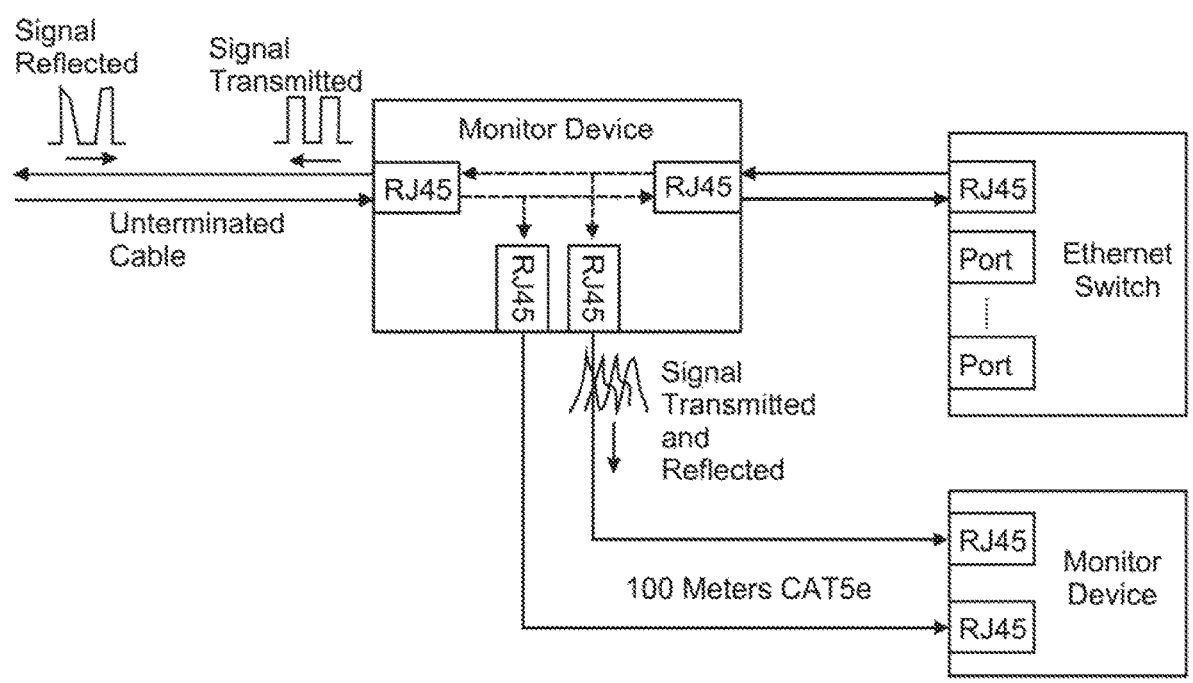
FIG. 7 is a schematic diagram illustrating signal distortion limitations of the prior art monitoring equipment of FIG. 6.

Another advantage or benefit is that the methods, circuitry and equipment of the present disclosure allow the monitoring of communication services when the wired service connection is not terminated or not terminated properly. Monitoring equipment using high impedance bridging may not be able to monitor services if the connection is not terminated or not terminated properly. An un-terminated or improperly terminated connection will cause signal reflections on the service. This signal reflection will distort the service and prevent the service from being monitored, as illustrated in FIG. 7 (Prior Art). The methods, circuitry and equipment of the present disclosure will allow no disruption of the monitoring the uplink services when the downlink service connection is not connected properly or is disconnected.

Referring hack to FIG. 1 (Prior Art), it should be understood that prior art monitoring equipment can allow anyone to monitor service simply by connecting to the port of the monitor device. The methods, circuitry and equipment of the present disclosure provide the ability to restrict the monitoring of services.

Figure 8:
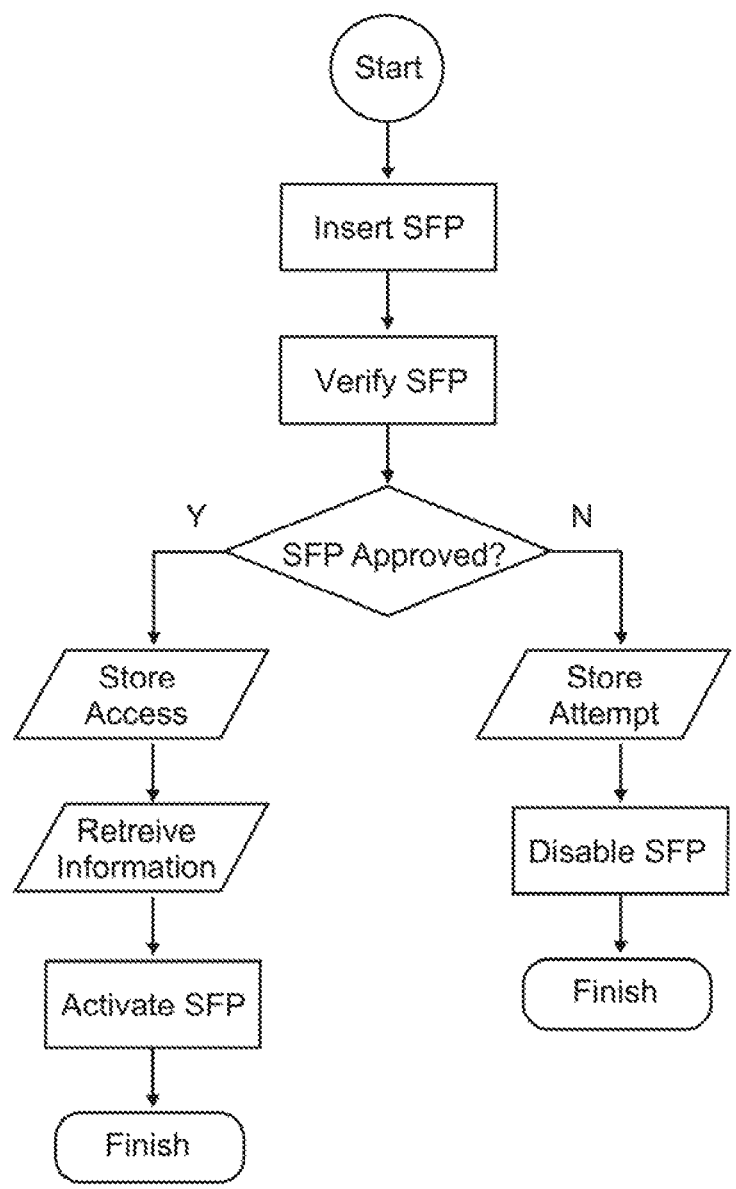
FIG. 8 is a flow chart illustrating the implementation of security measures in the communication equipment of the present disclosure to limit access to the communications network service to approved devices.
Figure 9:
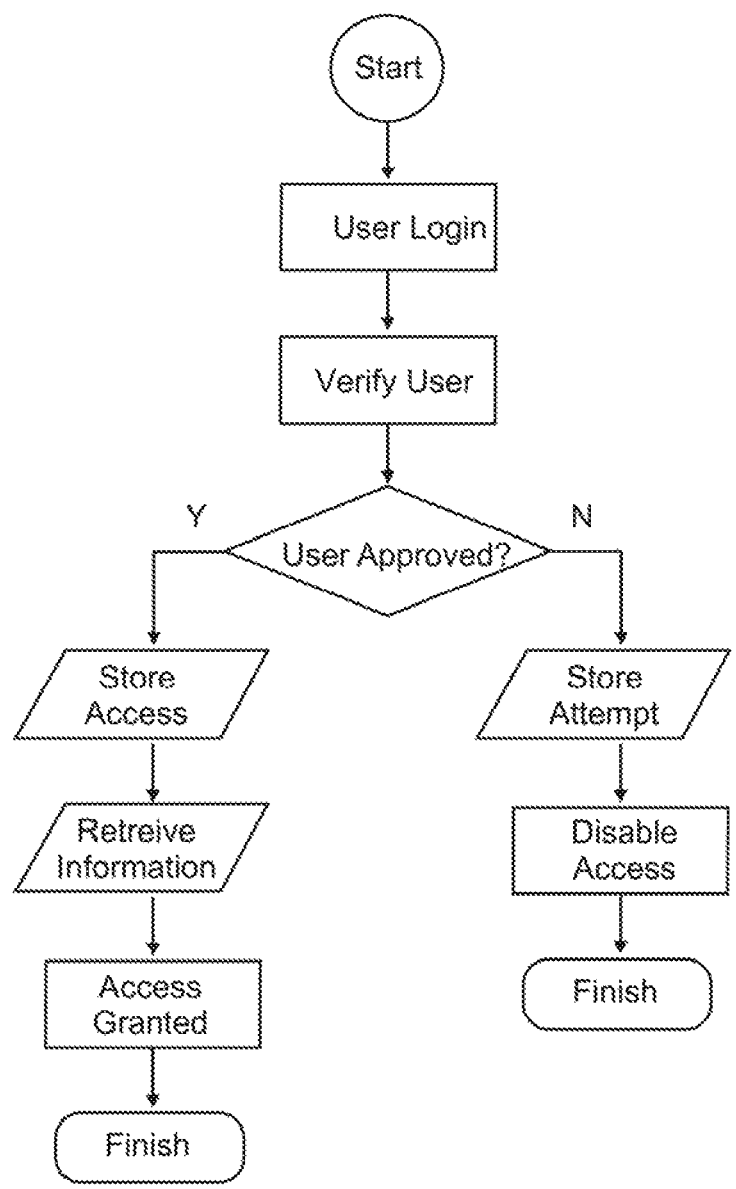
FIG. 9 is a flow chart illustrating the implementation of security measures in the monitoring equipment of the present disclosure to limit access to the communications network service to approved users.

As shown in the flow charts of FIGS. 8 and 9, security monitoring is accomplished by allowing specific type of devices for monitoring, e.g., only approved or authorized SFPs, as in FIG. 8, and/or by allowing specific users to monitor, e.g., only approved or authorized users, as in FIG. 9. The methods, circuitry and equipment of the present disclosure provide the ability to provide security by restricting the monitoring and accessing of services. The user can restrict the monitoring services for specific users or guidelines. Any suitable authentication or authorization procedures can be used in connection with the steps illustrated in FIG. 8 and FIG. 9 as is or may be known in the art of authentication/authorization of users and equipment.

The methods, circuitry and equipment of the present disclosure also improve the security of the Service Provider's equipment by preventing the uplink device or connection from removal. This is accomplished by the position and orientation of the SFP unit, which improves service reliability by ensuring that the uplink service is inaccessible from tampering or accidental removal. By preventing the uplink service device or connection from removal, the security of the Service Provider's equipment is improved.

Figure 10:
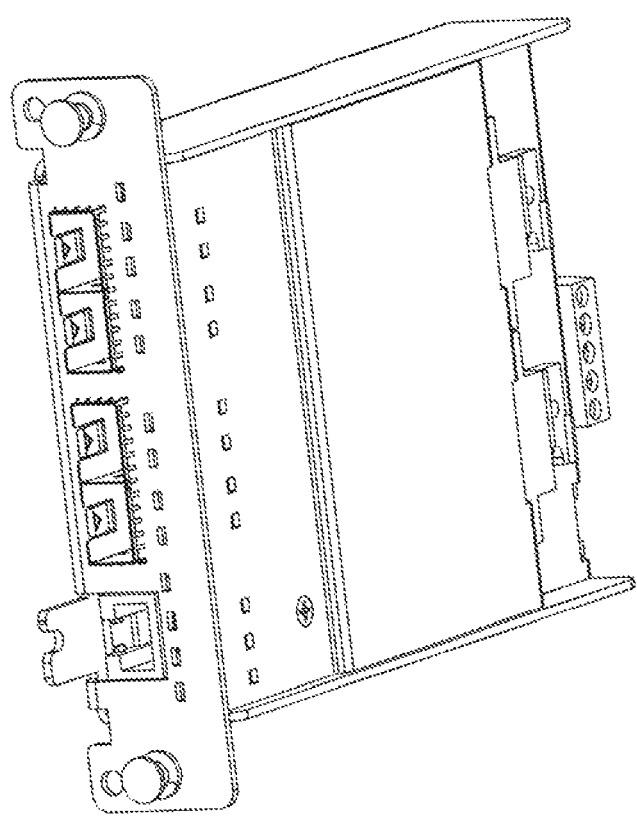
FIG. 10 is a front view of an embodiment of the communication equipment of the present disclosure.

FIG. 10 illustrates a front perspective view of an embodiment of an exemplary communication equipment of the present disclosure. As illustrated, four SFP ports are aligned or positioned in a two by two, front to front orientation. An RJ45 jack provides an RS232 craft interface for communication equipment and service status, and equipment provisioning.

Figure 11:
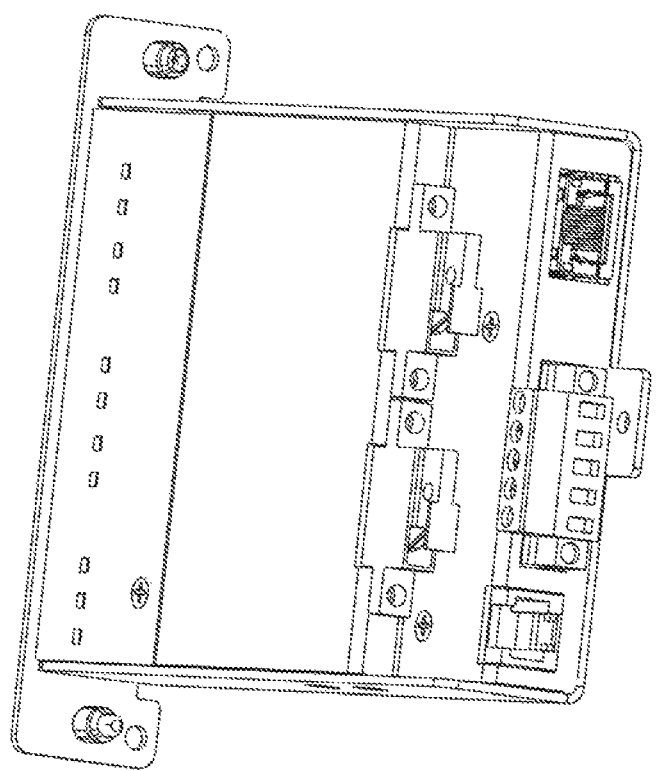
FIG. 11 is a rear view of an embodiment of the communication equipment of the present disclosure.

FIG. 11 illustrates a rear perspective view of an embodiment of an exemplary communication equipment of the present disclosure. As illustrated, two GMT type indication fuses are positioned horizontally. The two GMT type indication fuses provide redundant A-B input power feeds for the communication equipment. The GMT type indicator fuse provides a mechanical indicator when the fuse is opened during overcurrent conditions. A five position removable terminal block provides the dual input power connections and an electrical contact for GMT fuse alarm. A shielded RJ45 10/100BaseT Ethernet jack provides remote access for the communication equipment and service status and equipment provisioning. An RJ14 jack provides a communications interface for an external controller module.

Figure 12:
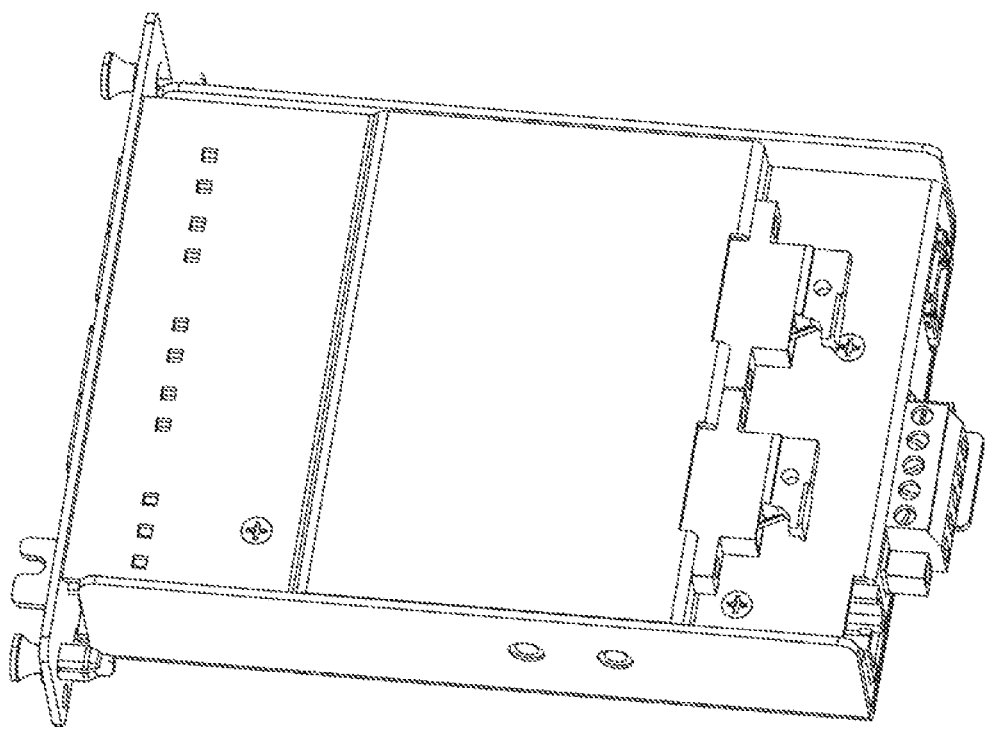
FIG. 12 is a top view of an embodiment of the communication equipment of the present disclosure.

FIG. 12 illustrates a top perspective view of an embodiment of an exemplary communication equipment of the present disclosure. As illustrated, a top cover is used to protect the electronic circuit assembly. The top cover provides LED indicators for equipment and service status when the communication equipment is horizontally installed on a wall.

Figure 13:
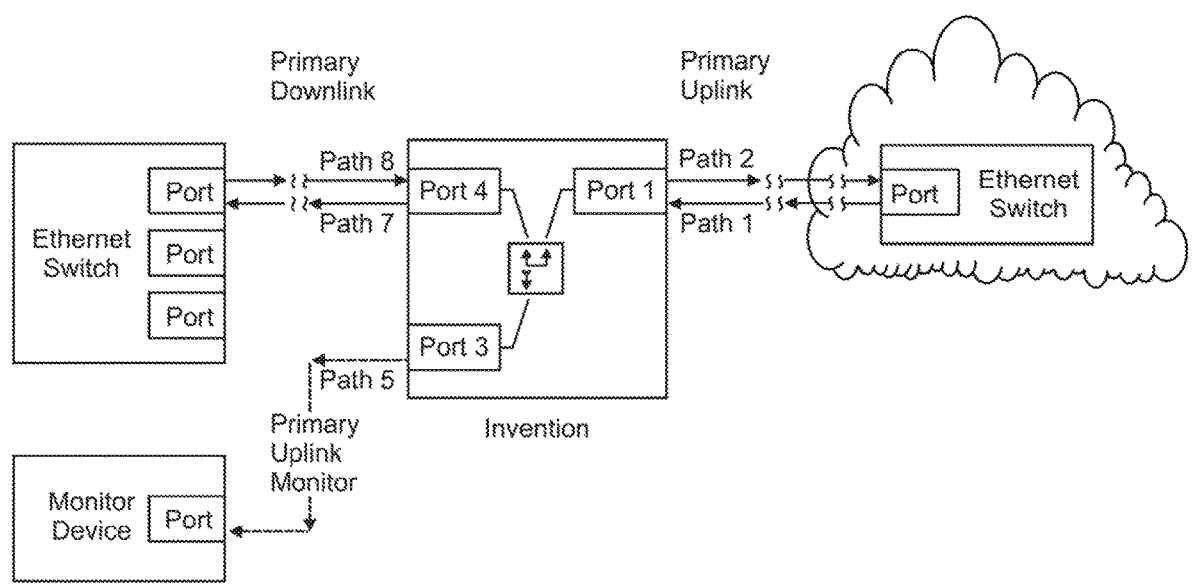
FIG. 13 is a schematic diagram illustrating, the communication equipment of the present disclosure providing the functionality of monitoring of the uplink path (or path 1).
Figure 14:
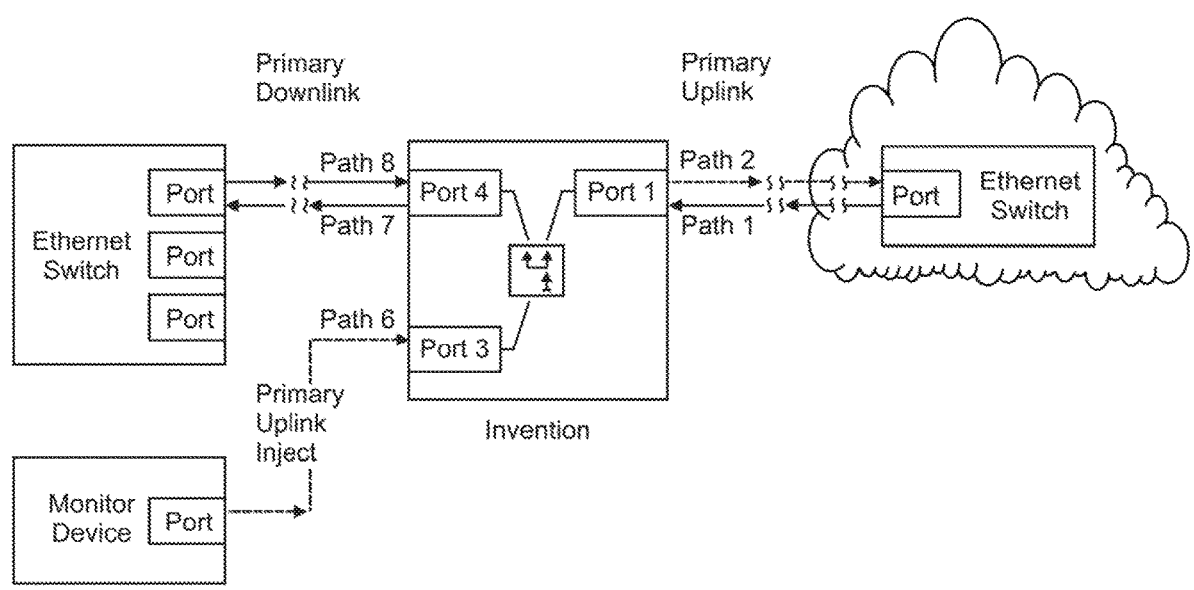
FIG. 14 is a schematic diagram illustrating the communication equipment of the present disclosure providing, the functionality of injecting from path 6 into the uplink path (or path 2).
Figure 15:
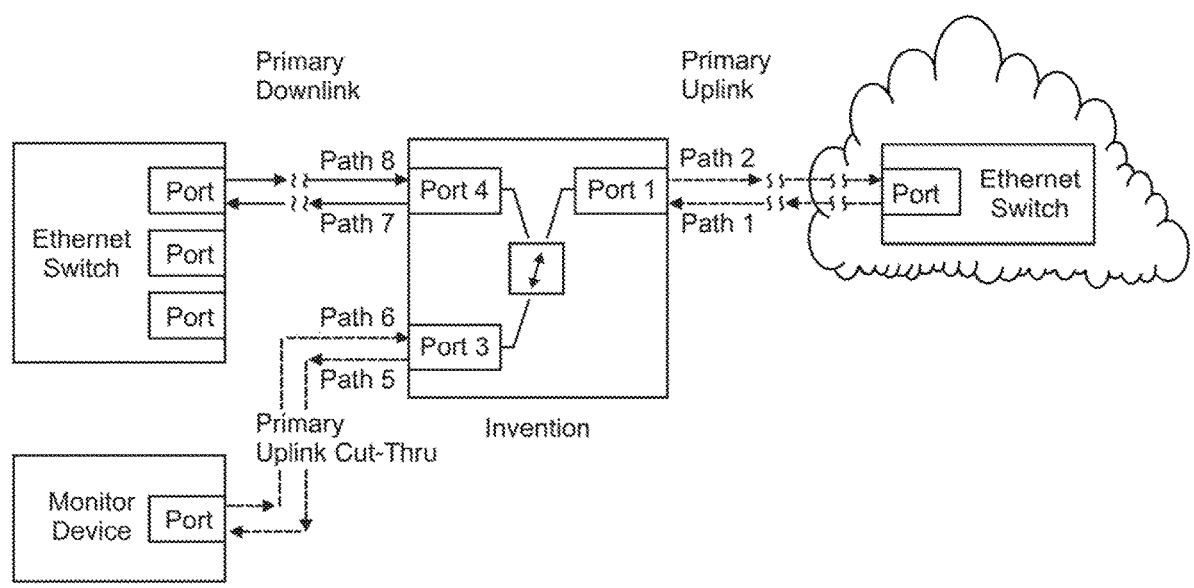
FIG. 15 is a schematic diagram illustrating the communication equipment of the present disclosure providing the functionality of cut-thru of the secondary paths (or path 5 and path 6) into the uplink paths (or path 1 and path 2).
Figure 16:
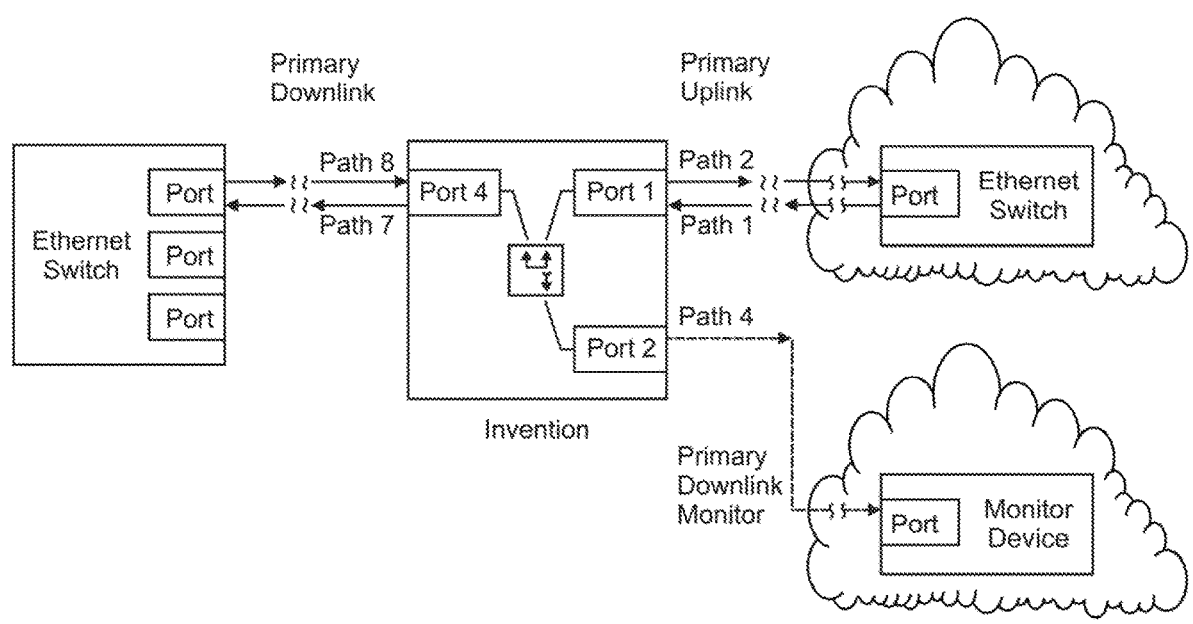
FIG. 16 is a schematic diagram illustrating the communication equipment of the present disclosure providing the functionality of monitoring of the downlink path (or path 8) through path 4.
Figure 17:
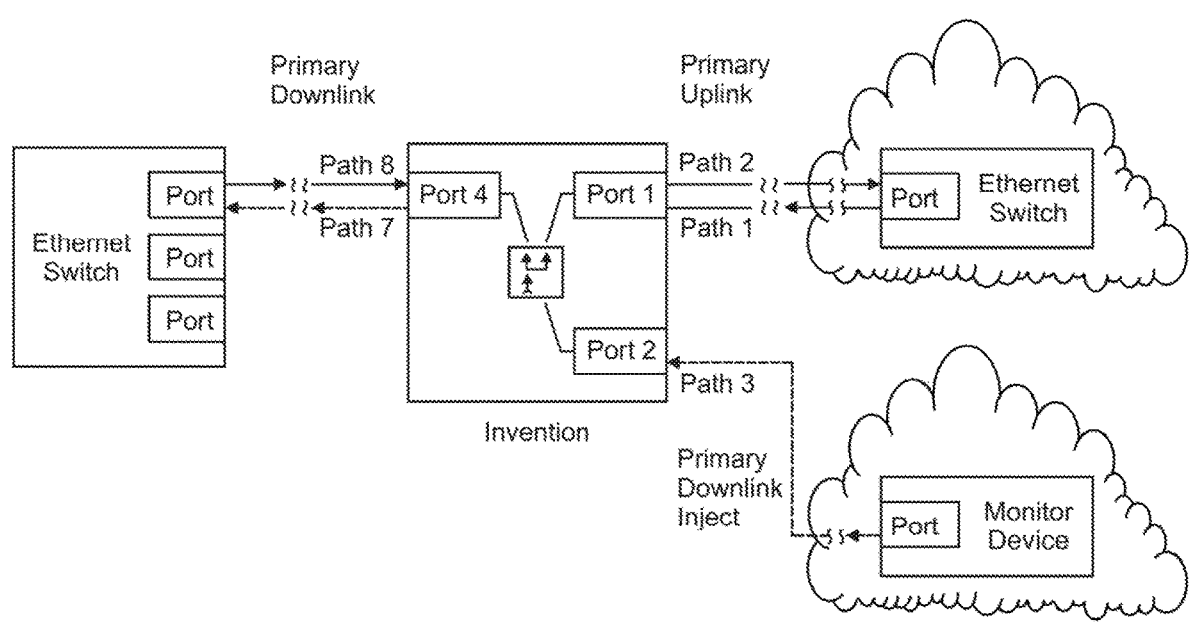
FIG. 17 is a schematic diagram illustrating the communication equipment of the present disclosure providing the functionality of injecting from path 3 into the downlink path (or path 7).
Figure 18:
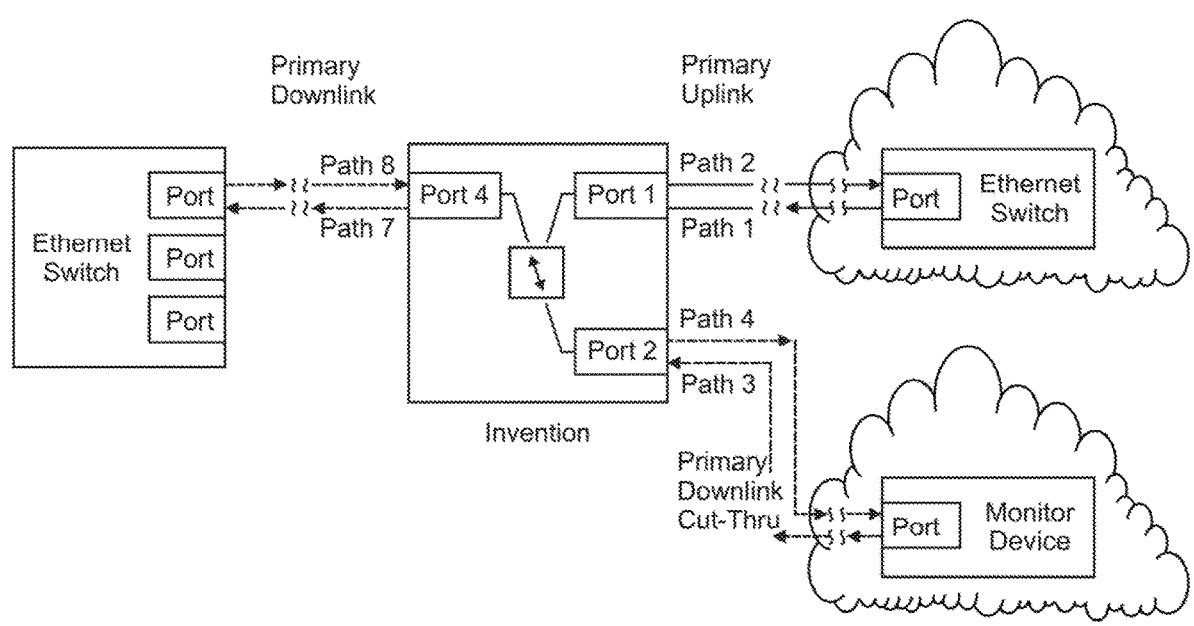
FIG. 18 is a schematic diagram illustrating the communication equipment of the present disclosure providing the functionality of cut-thru of the secondary paths (or path 3 and path 4) into the downlink paths (or path 7 and path 8)
Figure 19:
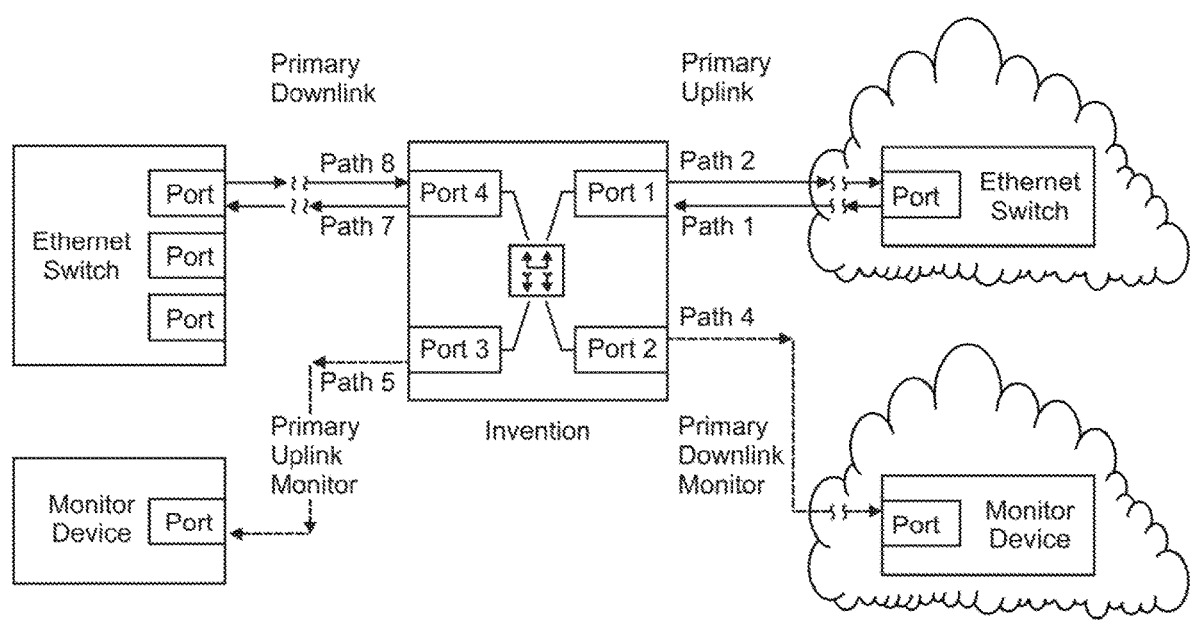
FIG. 19 is a schematic diagram illustrating the communication equipment of the present disclosure providing the functionality of monitoring of the uplink path (or path 1) through path 5 and the downlink path (or path 8) through path 4.
Figure 20:
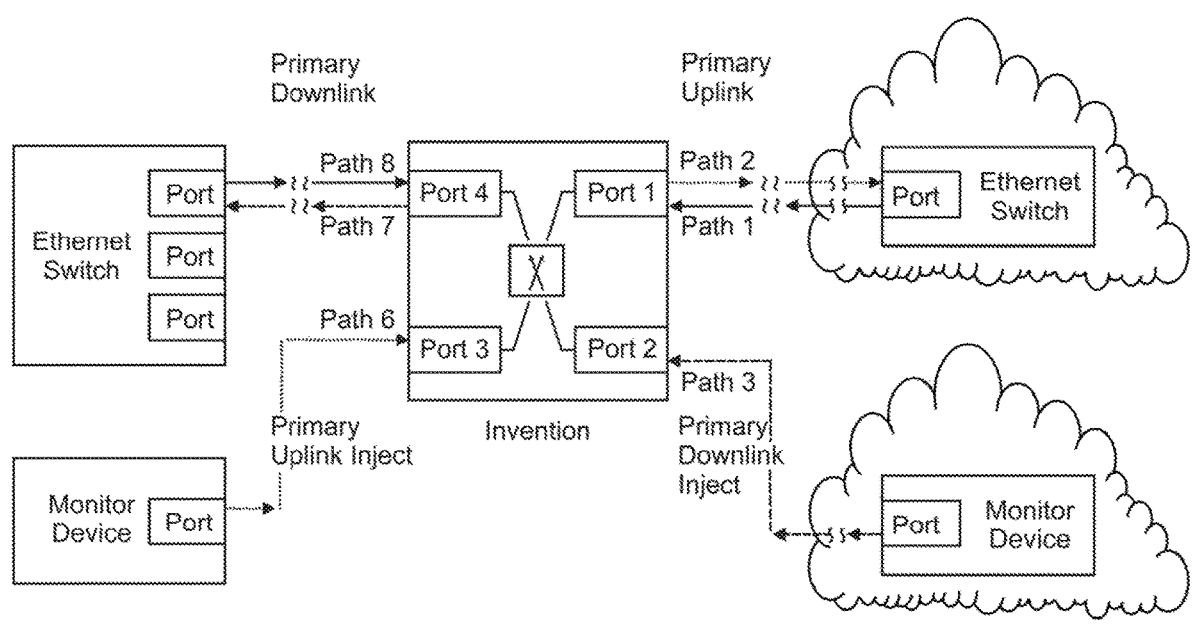
FIG. 20 is a schematic diagram illustrating the communication equipment of the present disclosure providing the functionality of injecting from the secondary path (path 6) into the uplink path (path 2) and of injecting from the secondary path (or path 3) into the downlink path (or path 7).
Figure 21:
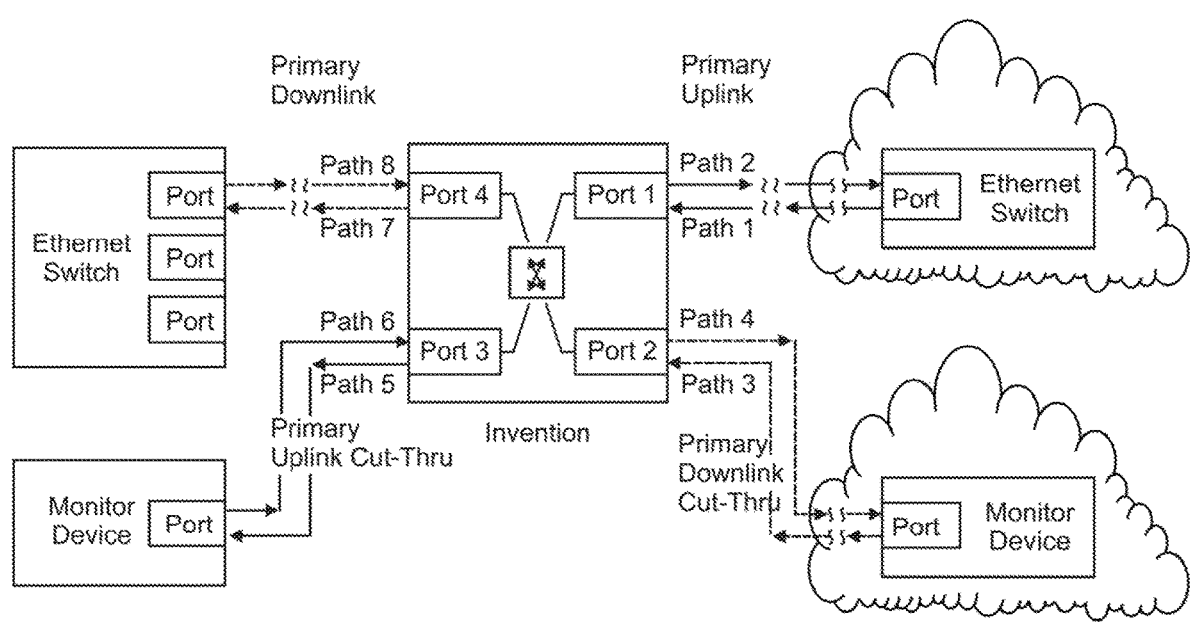
FIG. 21 is a schematic diagram illustrating the communication equipment of the present disclosure providing the functionality of cut-thru of the secondary paths (or path 5 and path 6) into the uplink paths (or path 1 and path 2) and cut-thru of the secondary paths (or path 3 and path 4) into the downlink paths (or path 7 and path 8).

With respect to monitoring, the methods, circuitry and equipment of the present disclosure provide the ability and functionality of injecting and cut-thru using any media type. The user has the flexibility to provide injecting and cut-thru in the primary uplink, primary downlink, or both ports. In FIG. 13, the port 3 path 5 monitors of the primary uplink (port 1) secondary path 1. In FIG. 14, port 3 path 6 can inject into the primary uplink (port 1) path 2 for testing. In FIG. 15, port 3 paths (path 5 and path 6) can cut-thru into the primary uplink (port 1) paths (path 1 and path 2) for testing. In FIG. 16, port 2 path 4 monitors the primary downlink port 4 path 8. In FIG. 17 the port 2 path 3 can inject into the primary downlink port 4 path 7 for testing. In FIG. 18, port 2 paths (path 3 and path 4) can cut-thru into the primary downlink port 4 paths (path 7 and path 8) for testing. In FIG. 19, port 3 path 5 monitors the primary uplink port 1 path 2, and port 2 path 4 monitors the primary downlink port 4 path 8. In FIG. 20, port 3 path 6 can inject into the primary uplink port 1 path 2, and port 2 path 3 can inject into the primary downlink port 4 path 7. In FIG. 21, port 3 paths (path 5 and path 6) can cut-thru into the primary uplink port 1 paths (path 1 and path 2) for testing. In addition, port 2 paths (path 3 and path 4) can cut-thru into the primary downlink port 4 paths (path 7 and path 8) for testing.

With respect to redundancy, the methods, circuitry and equipment of the present disclosure provide the ability and functionality of service protection switching (i.e. redundant services) using any media type. The user has the flexibility to provide redundancy in the uplink or downlink paths for reliability. The user also has the ability to provide redundant service simultaneously from the uplink or downlink path. The ability to provide redundant services in any direction or in both directions will allow the user to ensure the service reliability in all applications.

Figure 22:
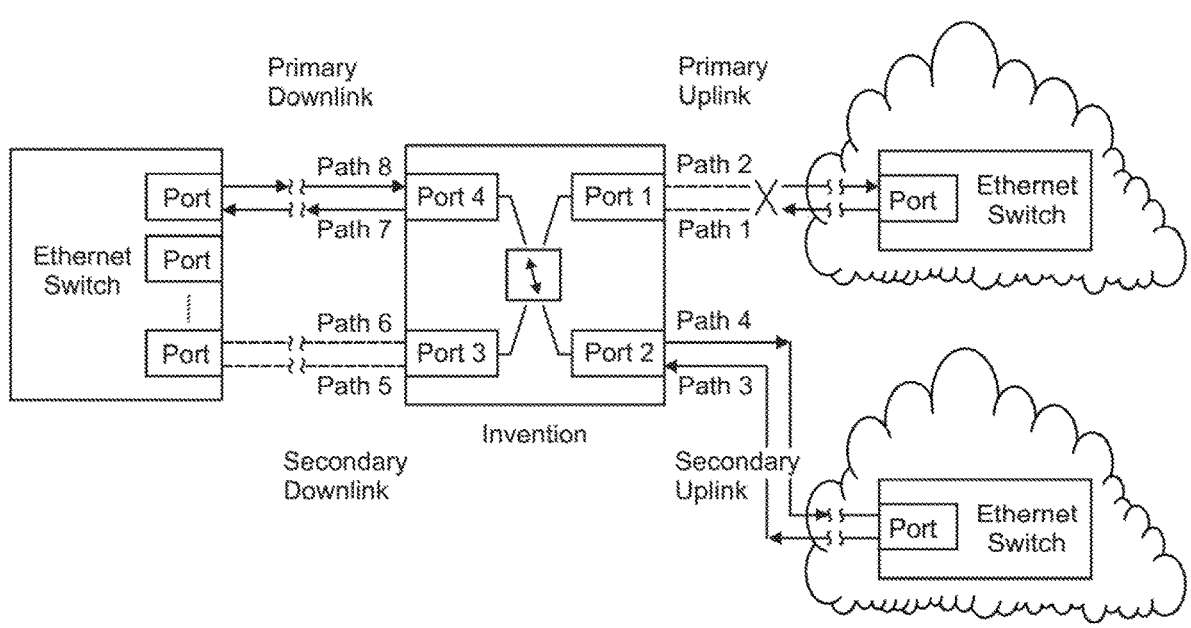
FIG. 22 is a schematic diagram illustrating the communication equipment of the present disclosure providing the functionality of redundancy of the uplink paths (or path 1 and path 2).
Figure 23:
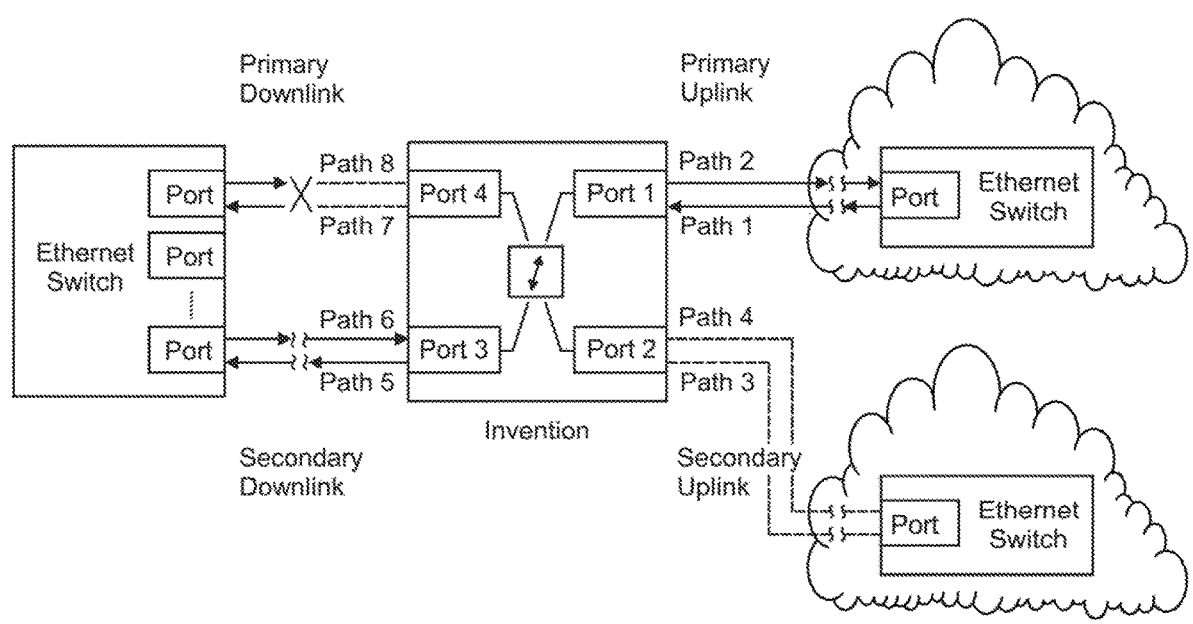
FIG. 23 is a schematic diagram illustrating the communication equipment of the present disclosure providing the functionality of redundancy of the downlink paths (or path 7 and path 8).
Figure 24:
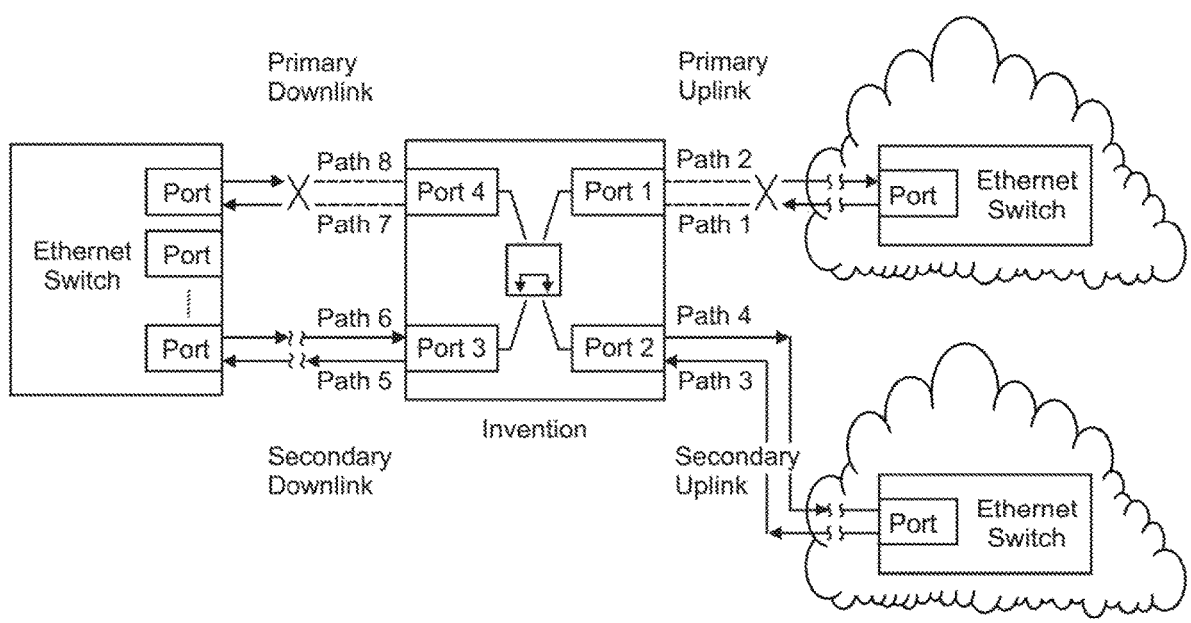
FIG. 24 is a schematic diagram illustrating the communication equipment of the present disclosure providing die functionality of redundancy of both the uplink paths (or path 1 and path 2) and the downlink paths (or path 7 and path 8).

FIGS. 22-24 illustrate the flexibility of the methods, circuitry and equipment of the present disclosure to provide redundancy in one or both paths for reliability. FIG. 22 illustrates the provision of redundancy of the primary uplink port 1 paths (path 1 and path 2) with the secondary uplink port 2 paths (path 3 and path 4) with any media type. The primary downlink port 4 paths (path 7 and path 8) maintain service. FIG. 23 illustrates the provision of redundancy of the primary downlink port 4 paths (path 7 and path 8) with the secondary downlink port 3 paths (path 5 and path 6) with any media type. The primary uplink port 1 paths (path 1 and path 2) maintain service. FIG. 24 illustrates the provision of redundancy of both primary uplink port 1 path (path 1 and path 2) and primary downlink port 4 paths (path 7 and path 8) with any media type. The secondary uplink port 2 paths (path 3 and path 4) and the secondary downlink port 3 paths (path 5 and path 6) maintain service.

Further, the methods, circuitry and equipment of the present disclosure can provide multiple functionality at the same time. For example, the functionality of monitoring or the functionality of cut-thru can be provided at the same time that the functionality of redundancy is being provided. FIGS. 13-21 are illustrative of this. In FIG. 13, the port 3 path 5 monitors the primary uplink port 1 path 1. In FIG. 14, port 3 path 6 can inject into the primary uplink port 1 path 2 for testing. In FIG. 15, port 3 paths (path 5 and path 6) can cut-thru into the primary uplink port 1 paths (path 1 and path 2) for redundancy (i.e. during a protection switch operation) as illustrated. In FIG. 16, port 2 path 4 monitors the primary downlink port 4 path 8. In FIG. 17, the port 2 path 3 can inject into the primary downlink port 4 path 7 for testing. In FIG. 18, port 2 paths (path 3 and path 4) ran cut-thru into the primary downlink port 4 paths (path 7 and path 8) for redundancy (i.e. during a protection switch operation) as illustrated.

Figure 25:
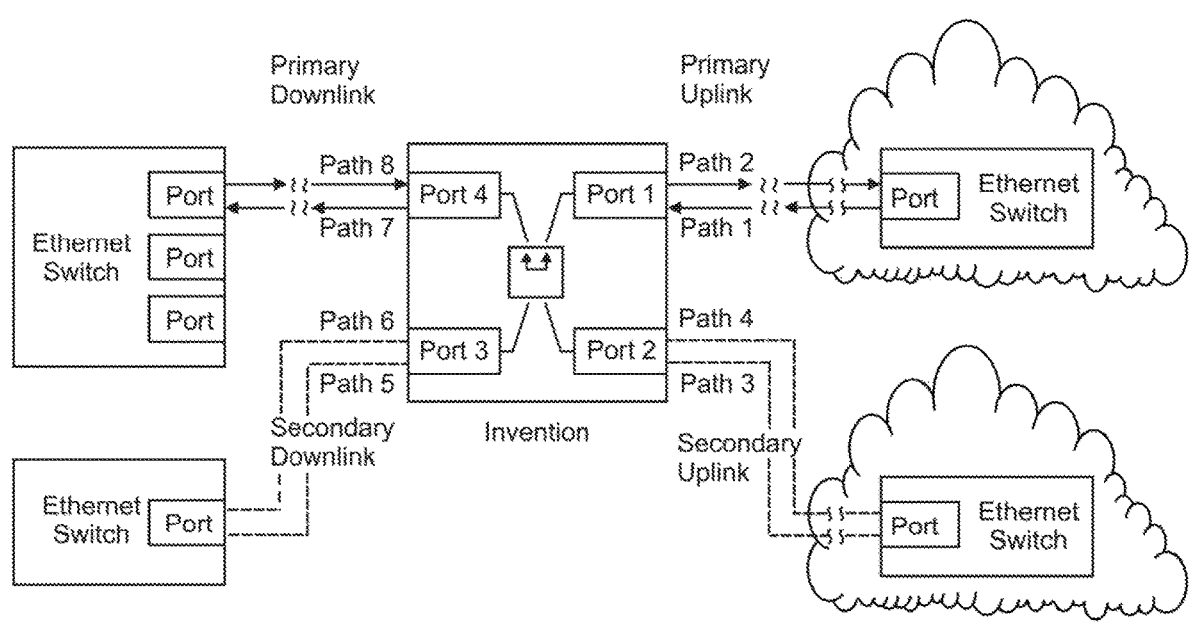
FIG. 25 is a schematic diagram illustrating the communication equipment of the present disclosure provisioned for the functionality of on-demand service.
Figure 26:
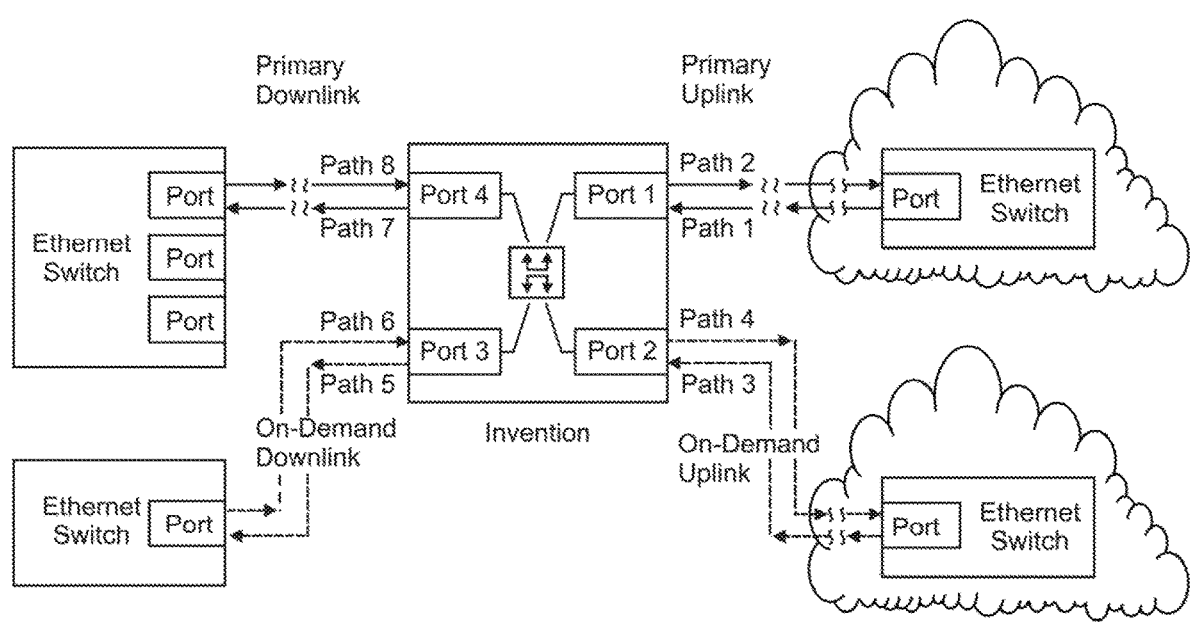
FIG. 26 is a schematic diagram illustrating the communication equipment of the present disclosure providing the functionality of on-demand service.

Still further, the methods, circuitry and equipment of the present disclosure can provide the user with On-Demand, additional service when provisioned for a redundant, monitor, or cut-thru operation. The user can add an additional service without the need to install additional equipment or travel to the facility to add service. As illustrated in FIG. 25, this On-Demand service can be added when the circuitry and equipment of the present disclosure is provisioned in "normal", "monitor", "cut-thru", or "redundant" operations. FIG. 26 illustrates an On-Demand service being provided via the circuitry and equipment of FIG. 25. This on-demand service can be provided with any media type.

Figure 27:
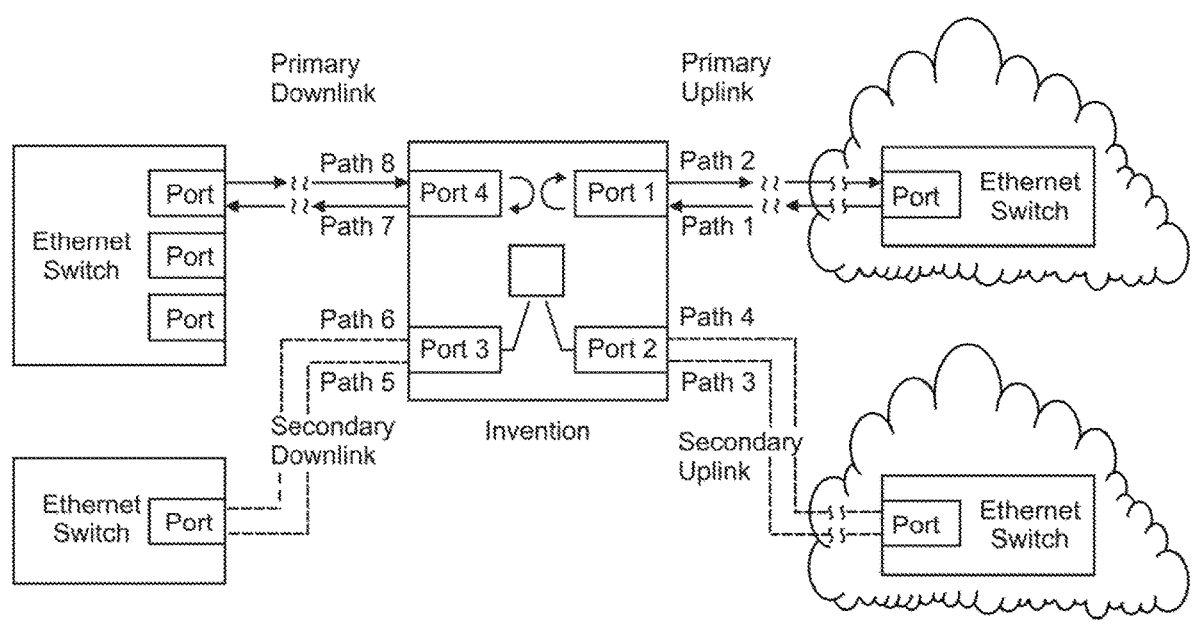
FIG. 27 is a schematic diagram illustrating the communication equipment of the present disclosure providing the functionality of testing the service by routing the signal hack to its source.

The methods, circuitry and equipment of the present disclosure also allow the user to test the service by routing the communication signals back to their source. FIG. 27 illustrates this primary method of testing the service path. For the primary uplink port 1, path 1 routes back to path 2. For the primary downlink port 4, path 8 routes back to path 7. Overall, the methods, circuitry and equipment of the present disclosure will allow the use the ability to fully access (transmit and receive) the communication service, 10/100/10GE, SAN, SONET, Video, etc., to perform diagnostic, troubleshooting, or other functions from a monitoring or tap function.

Figure 28:
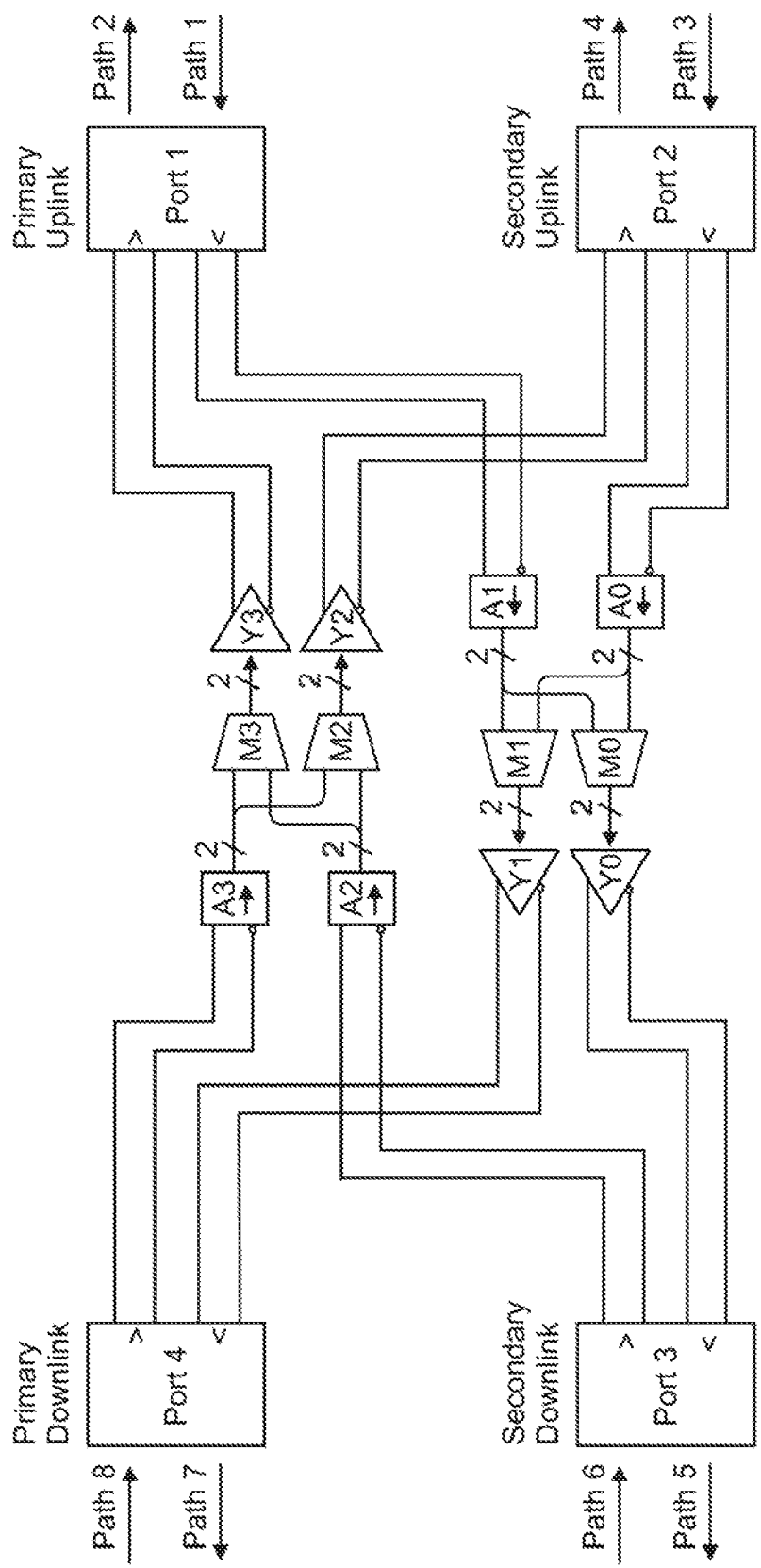
FIG. 28 is a block diagram illustrating one embodiment of the present disclosure.

FIG. 28 illustrates a block diagram of circuitry of the present disclosure involving four ports; Port 1, Port 2, Port 3, and Port 4 and eight differential signal paths. Port 1 has two differential signal paths, P1 and P2. Port 2 has two differential signal paths P3 and P4. Port 3 has two differential signal paths P5 and P6. Port 4 has two differential signal paths P7 and P8.

There are four input broadband differential amplifiers A0, A1, A2, and A3. The broadband differential amplifiers provide amplification and conditioning of the input signal. There are four multiplexer switches M0, M1, M2, and M3. The multiplexer switches functions as a crosspoint switch, demultiplexer, or multiplexer for routing the signals. There are four high speed output differential amplifiers Y0, Y1, Y2, and Y3. The high speed output differential amplifiers provide fixed or variable output voltages with and without pre-emphasis.

Port 1 comprises a Path P1 representing an input differential signal and a Path P2 representing an output differential signal. Port 2 comprises a Path P3 representing an input differential signal and a Path P4 representing an output differential signal. Port 3 comprises a Path P6 representing an input differential signal and a Path P5 representing an output differential signal. Port 4 comprises a Path P8 representing an input differential signal and a Path P7 representing an output differential signal.

Path P1 input differential signals connect to the input differential amplifier A1. The output signal from differential amplifier A1 can be a differential or common-mode signal. This output signal from differential amplifier A1 connects to the input of Multiplexer Switch M1 and M0.

Path P2 output differential signals connect to the output differential amplifier Y3. The input signal to differential amplifier Y3 can be a differential or common-mode signal. This input signal to differential amplifier Y3 connects to the output of Multiplexer Switch M3.

Path P3 input differential signals connect to the input differential amplifier A0. The output signal from differential amplifier A0 can be a differential or, common-mode signal. This output signal from differential amplifier A0 connects to the input of Multiplexer Switch M0 and M1.

Path P4 output differential signals connect to the output differential amplifier Y2. The input signal to differential amplifier Y2 can be a differential or common-mode signal. This input signal to differential amplifier Y2 connects to the output of Multiplexer Switch M2.

Path P5 output differential signals connect to the output differential amplifier Y0. The input signal to differential amplifier Y0 connects to the output of Multiplexer Switch M0.

Path P6 input differential signals connect to the input differential amplifier A2. The output signal from differential amplifier A2 can be a differential common-mode signal. This output signal from differential amplifier A2 connects to the input of Multiplexer Switch M2 and M3.

Path P7 output differential signals connect to the output differential amplifier Y1. The input signal to differential amplifier Y1 connects to the output of Multiplexer Switch M1.

Path P8 input differential signals connect to the input differential amplifier A3. The output signal from differential amplifier A3 can be a differential or common-mode signal. This output signal from differential amplifier A3 connects to the input of Multiplexer Switch M3 and M2.

Figure 29:
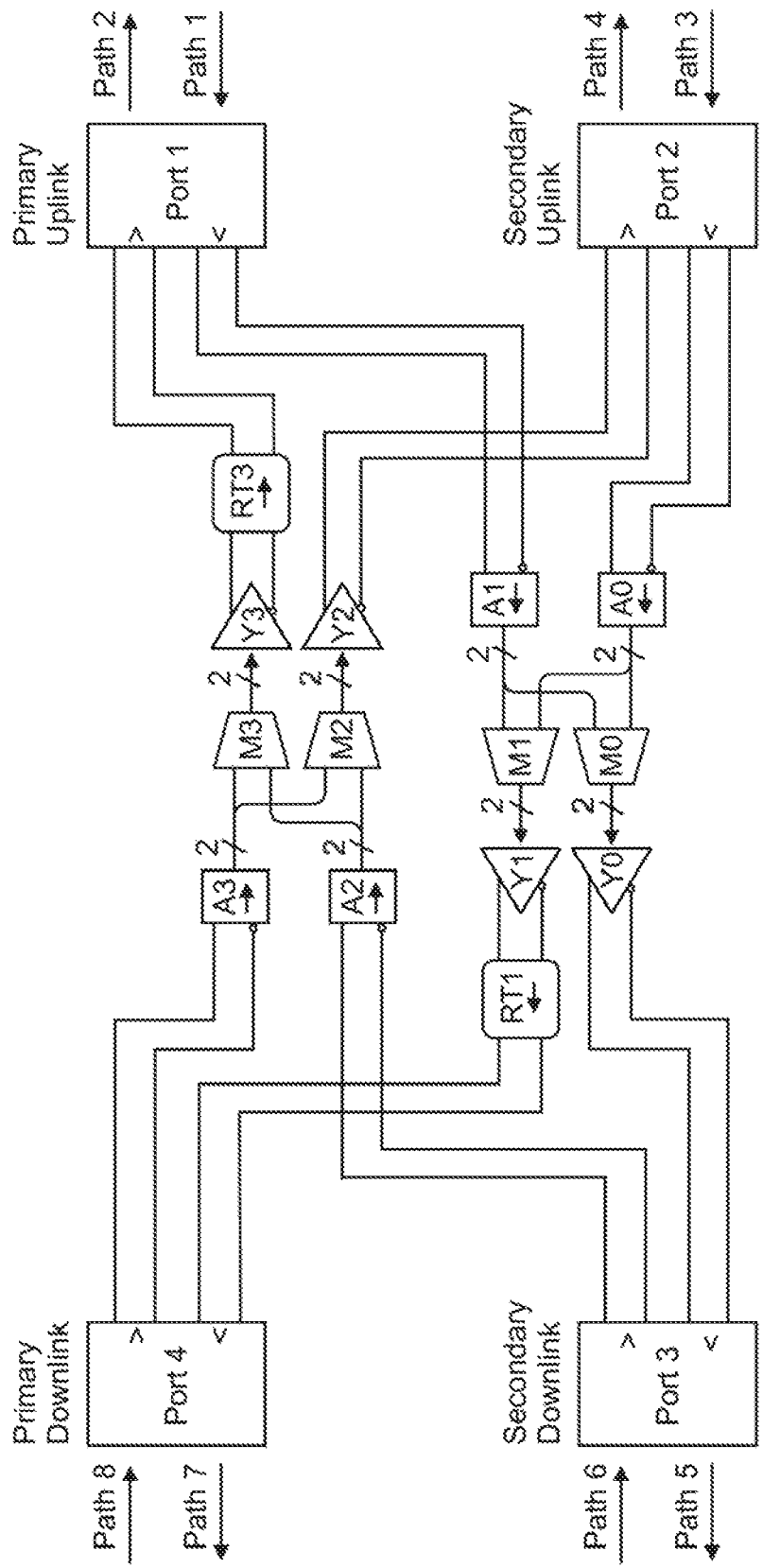
FIG. 29 is a block diagram illustrating another embodiment of the present disclosure with retimers on port 1 path 2 and port 4 path 7.

FIG. 29 illustrates a block diagram of an alternate embodiment of the circuitry of the present disclosure. The circuitry includes differential input amplifiers A0, A1, A2, and A3, multiplexers M0, M1, M2, and M3, retimers RT1 and RT3, and differential output amplifiers Y0, Y1, Y2, and Y3. The RT1 retimes the primary downlink signal to port 4 path 7 and RT3 retimes the primary uplink signal to port 1 path 2. RT1 and RT3 remove high-frequency jitter from the input signal and producing an output signal with reduced jitter.

Figure 30:
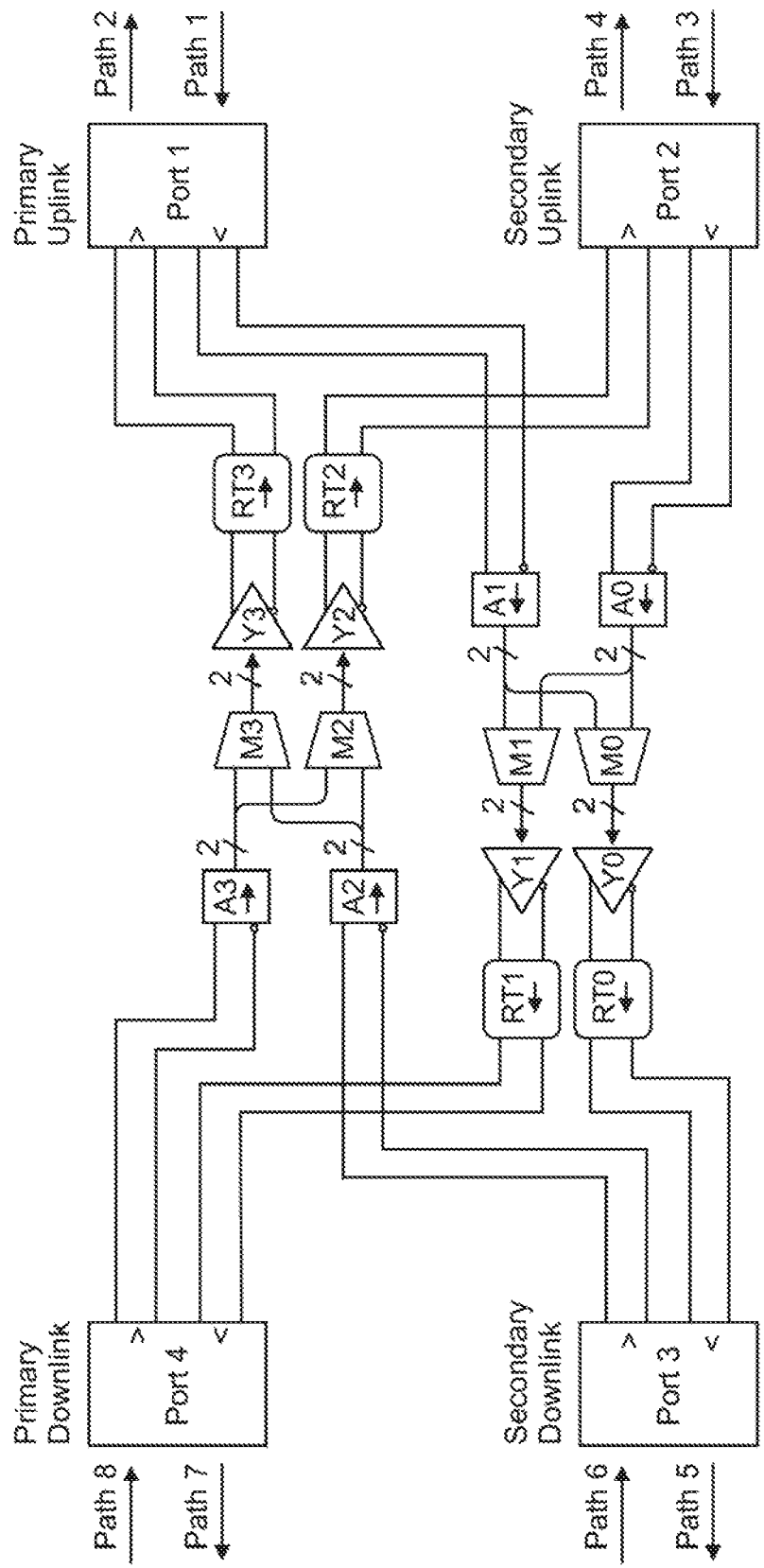
FIG. 30 is a block diagram illustrating another embodiment of the present disclosure with retimers on port 1 path 2, port 2 path 4, port 3 path 5, and port 4 path 7.

FIG. 30 illustrates another block diagram of the circuitry of the present disclosure. The circuitry includes amplifiers A0, A1, A2, and A3, multiplexers M0, M1, M2, and M3, retimers RT0, RT1, RT2, and RT3, and differential output amplifiers Y0, Y1, Y2, and Y3. This embodiment includes retimers on port 1 path 2, port 2 path 4, port 3 path 5, and port 4 path 7 to remove high-frequency jitter from the input, signal and produce an output signal with reduced jitter.

Figure 31:
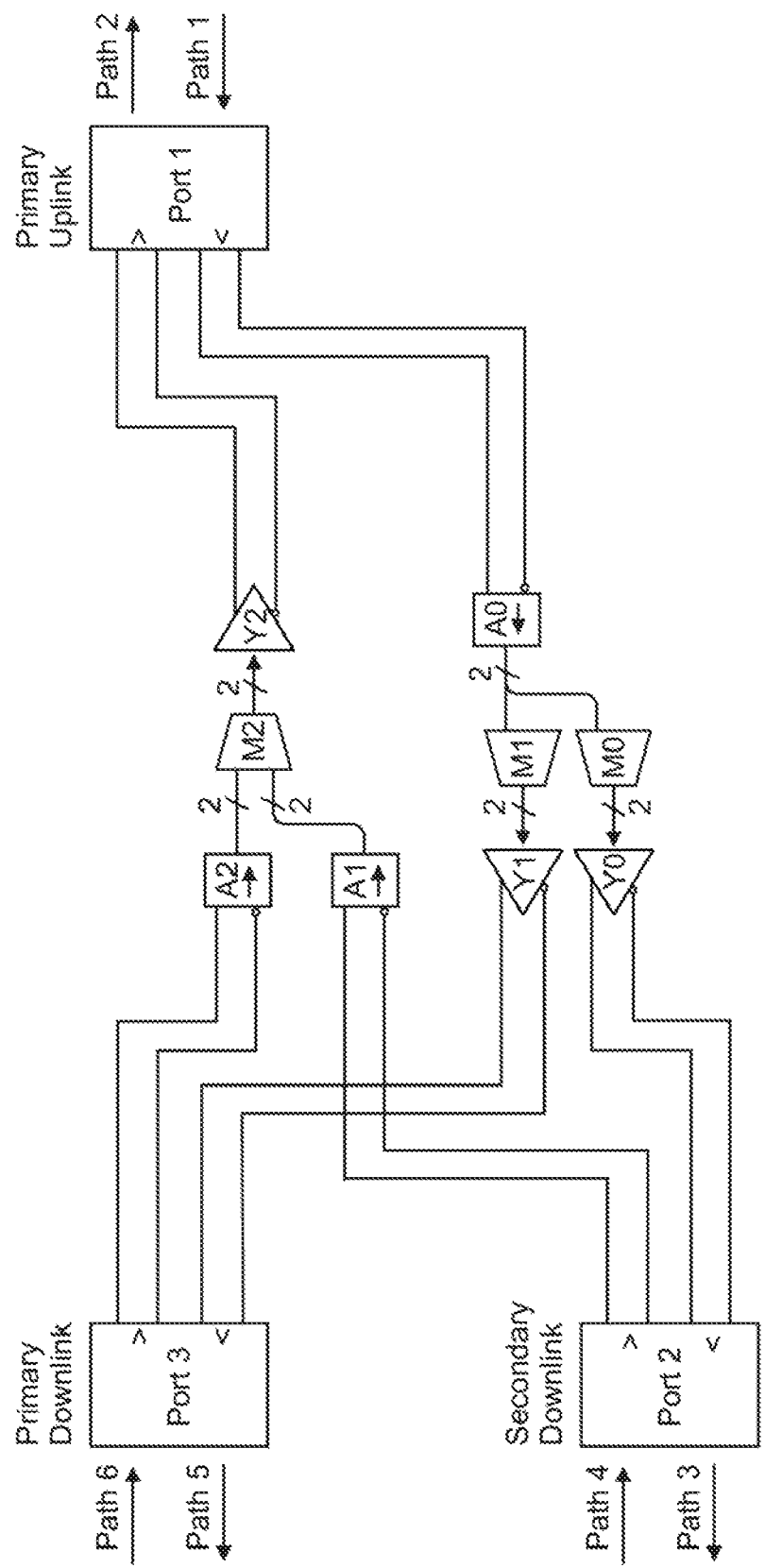
FIG. 31 is a block diagram illustrating another embodiment of the present disclosure with three ports.

FIG. 31 illustrates a block diagram of the circuitry of another embodiment of the present disclosure having three ports (Ports 1-3) and six paths (Paths 1-6). The circuitry includes differential input amplifiers A0, A1, A2, multiplexers M0, M1, and M2, and differential output Y0, Y1, and Y2. This embodiment provides monitoring, cut-thru, and redundancy using three ports. On-demand functionality is not supported in this embodiment due to the implementation of only three ports.

Figure 32:
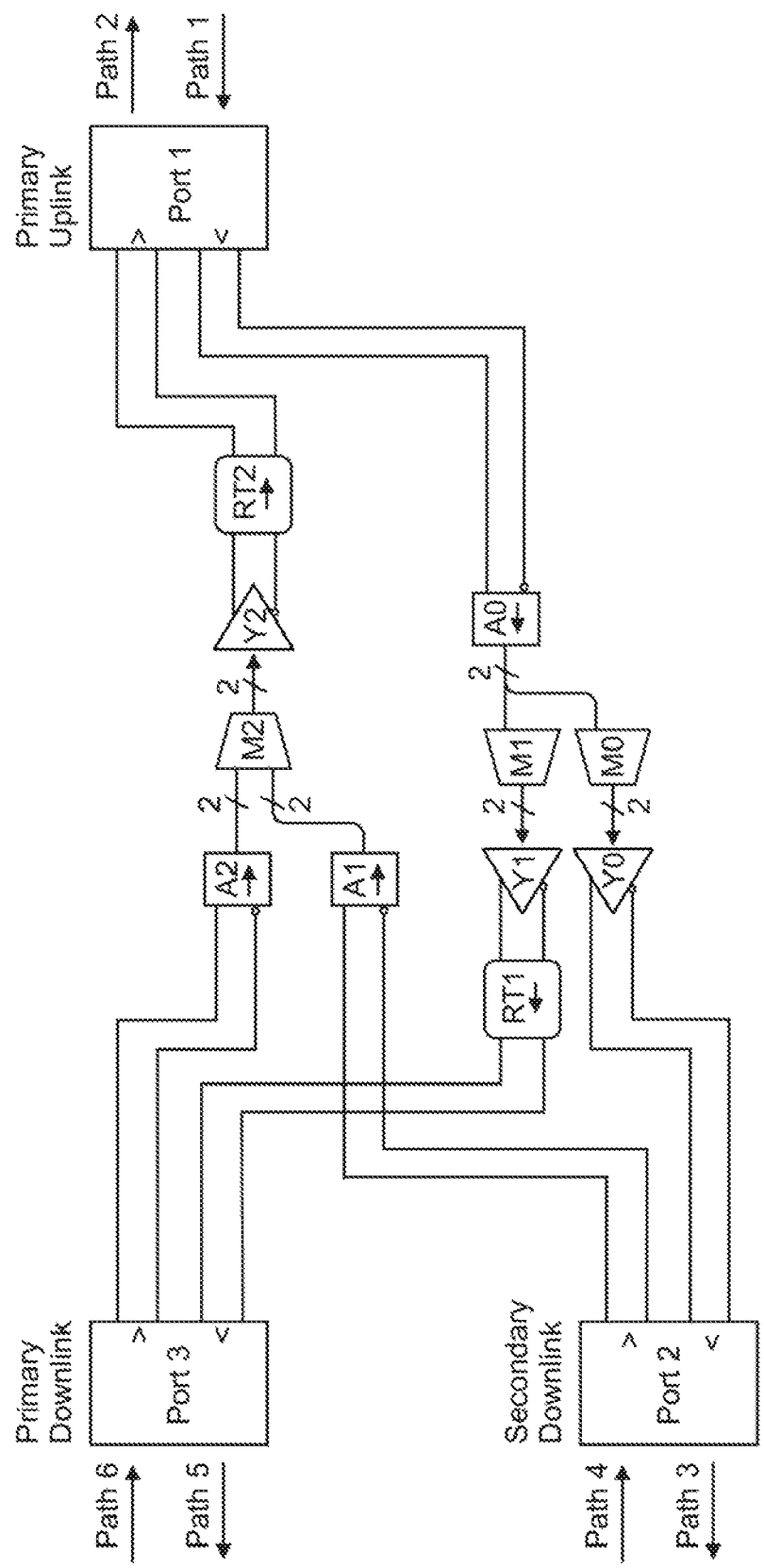
FIG. 32 is a block diagram illustrating another embodiment of the present disclosure with three ports and retimers.

FIG. 32 illustrates a block diagram of the circuitry of another embodiment of the present disclosure. The circuitry includes differential input amplifiers A0, A1, A2, multiplexers M0, M1, and M2, retimers RT1 and RT2, and differential output Y0, Y1, and Y2. The retimers function to remove high-frequency jitter from the input signal and produce an output signal with reduced jitter. This embodiment provides monitoring, cut-thru, and redundancy using three ports. On-demand functionality is not supported in this embodiment due to the implementation of only three ports.

Figure 33:
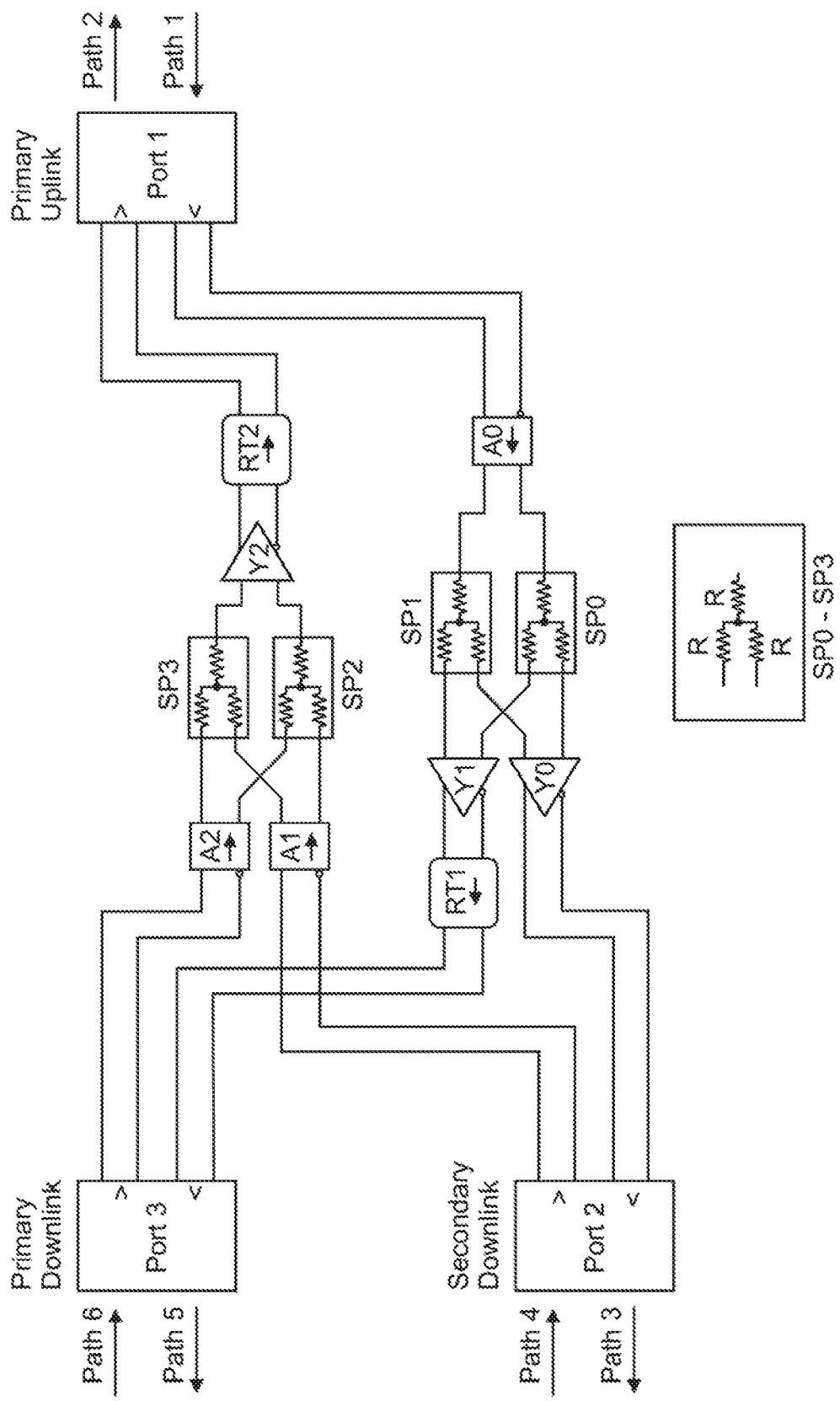
FIG. 33 is a block diagram illustrating another embodiment the present disclosure with three ports and retimers and using resistive dividers.

FIG. 33 illustrates a block diagram of the circuitry of another embodiment of the present disclosure. The circuitry includes differential input amplifiers A0, A1, A2, splitters SP0, SP1, SP2, and SP3, retimers RT1 and RT2, and differential output Y0, Y1, and Y2. In this embodiment, the splitters SP0-SP3 take, the place of the multiplexer switches M0-M2 in the previous embodiment of FIG. 32. The splitter SP0-SP3 impedance must match the differential impedance of the signal hoes, which is 100Ω. Each splitter SP0-SP3 will have a resistor value R of 16.5Ω 1%. This embodiment provides monitoring, cut-thru, and redundancy using three ports. On-demand functionality is not supported in this embodiment due to the implementation of only three ports.

Figure 34:
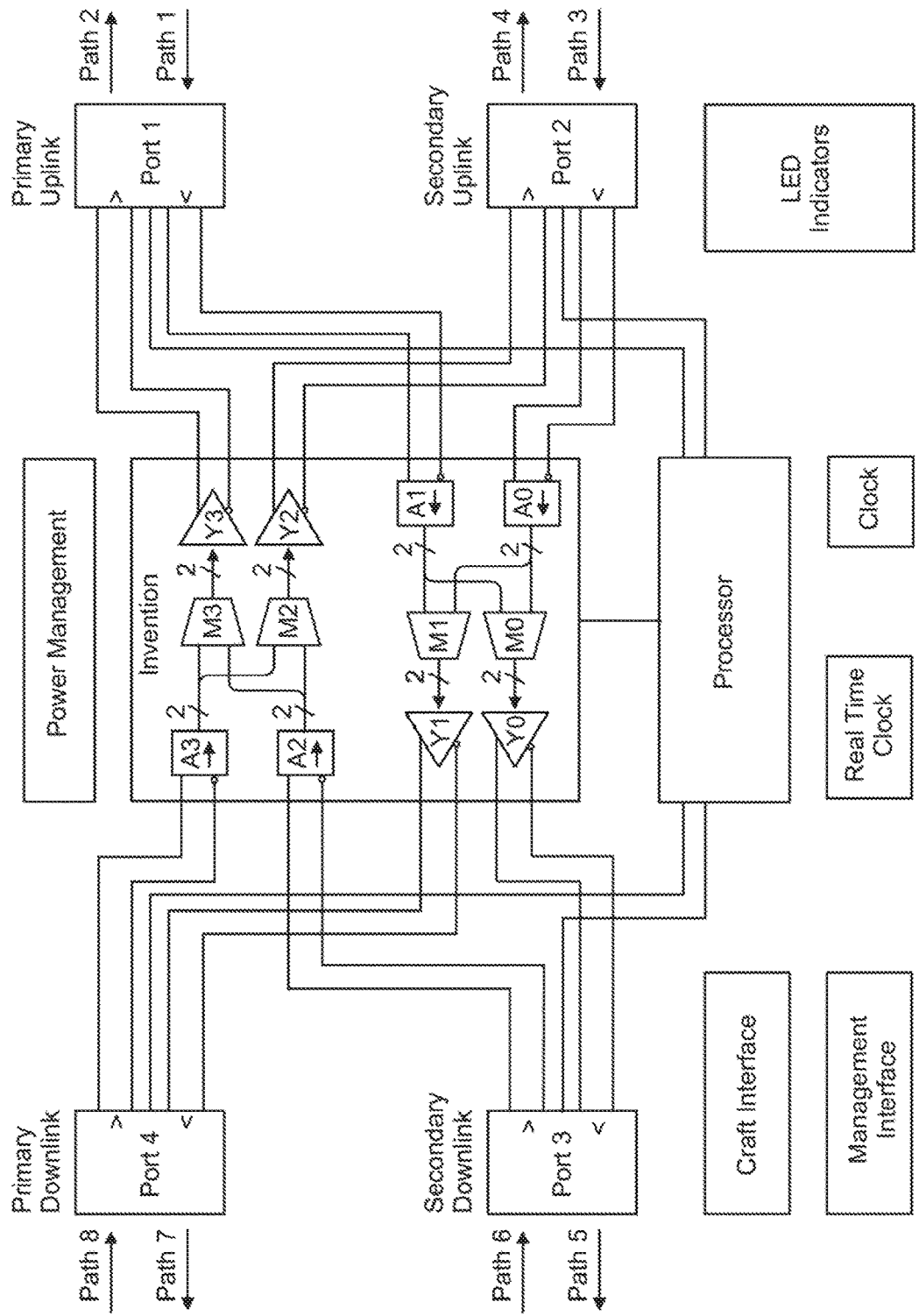
FIG. 34 is a block diagram illustrating exemplary communication equipment incorporating one or more aspects or features of the present disclosure.

FIG. 34 is a detailed block diagram of an exemplary embodiment of the communication equipment of the present disclosure providing the functionality described above. The communication equipment is illustrated as having four ports (Ports 1-4), eight paths (Paths 1-8), four input broadband differential amplifiers A0-A3, four multiplexer switches M0-M3, and four high speed output differential amplifiers Y0-Y3. The equipment, also comprises a processor, a clock, a real time clock, LED indicators, a craft interface, a management interface, and power management.

Figure 35:
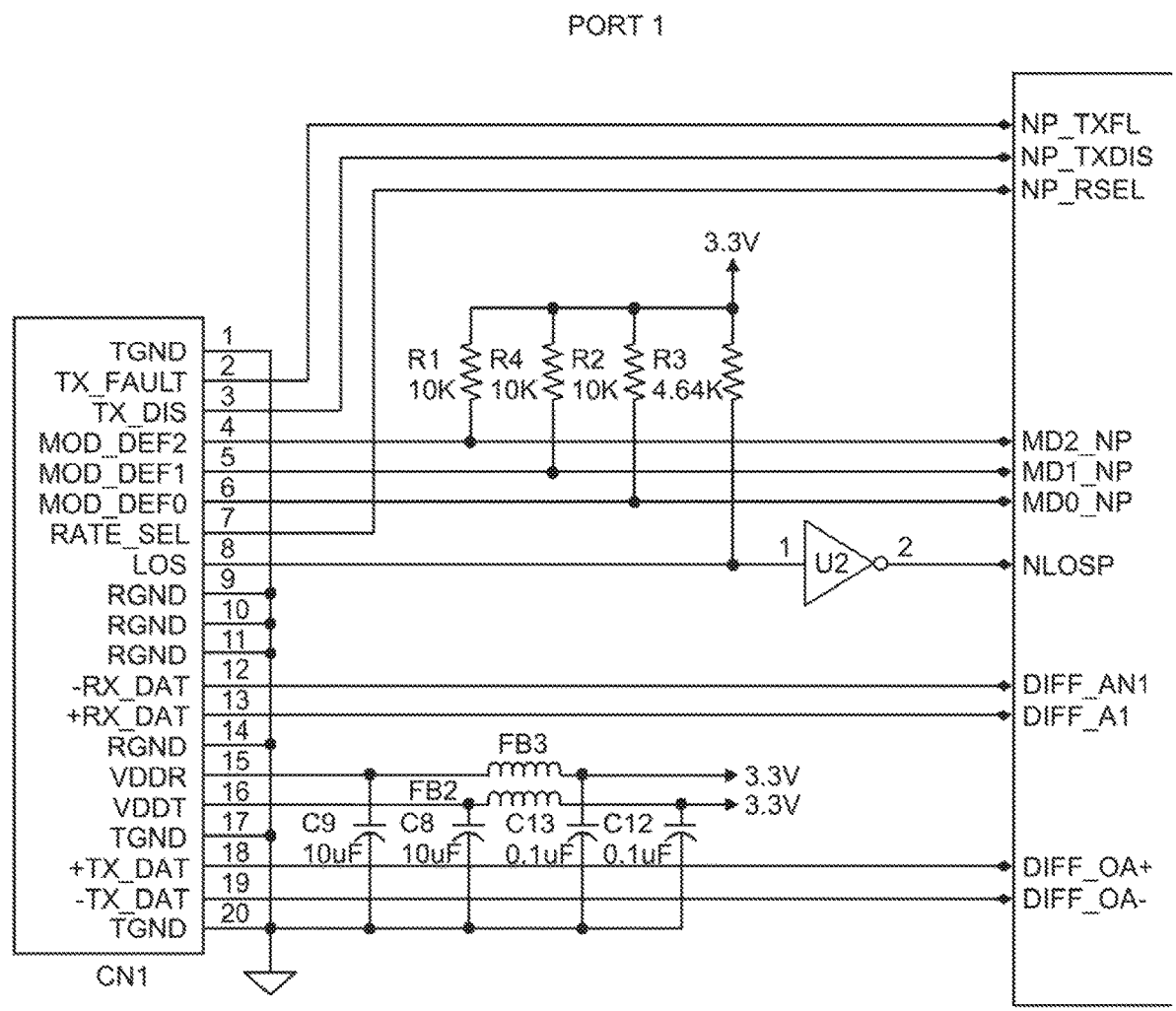
FIG. 35 is a circuit diagram of Port 1 (Primary Uplink) of the communication equipment of FIG. 34.

FIG. 35 is a circuit diagram of the primary uplink port 1. Connector CN1 accepts SFP+ pluggable devices, resistors R1, R2, R3 and R4 are pullup resistors for open impedance connections. Integrated circuit U2 is an inverter for the primary uplink SFP+ device open drain loss-of-signal (LOS) connection. Capacitors C8, C9, C12, and C13 and Ferrite beads FB2 and FB3 provide power supply filtering for the SFP+ device.

Figure 36:
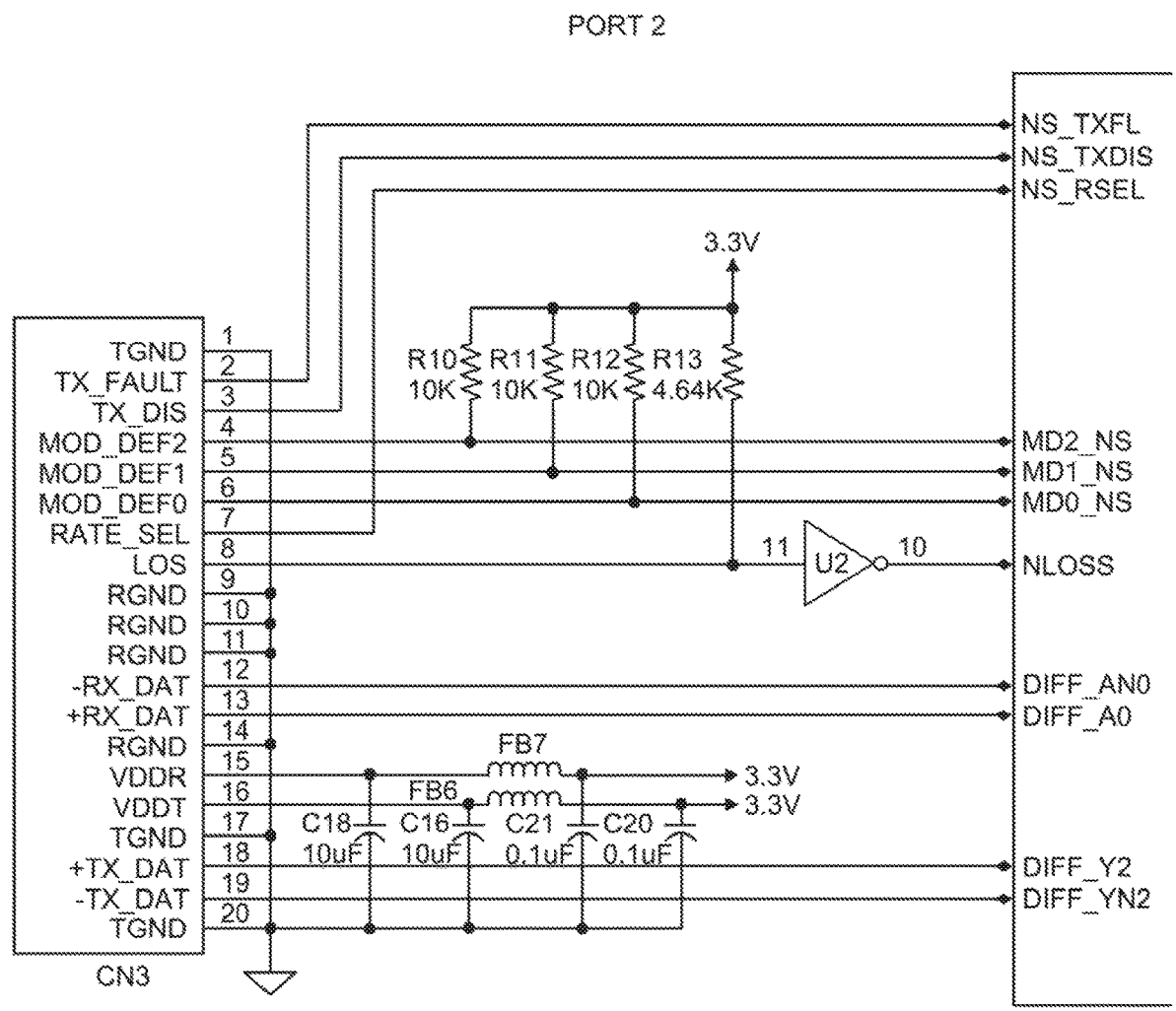
FIG. 36 is a circuit diagram of Port 2 (Secondary Uplink, Downlink Monitor/Inject, or Downlink Cut-Thru) of the communication equipment of FIG. 34.

FIG. 36 is a circuit diagram of the primary downlink monitor, inject, and cut-thru, secondary port 2 (as illustrated in FIGS. 16-18 respectively), which is also the secondary uplink port for On-demand services (as illustrated in FIG. 25). Connector CN3 accepts SFP+ pluggable devices, resistors R10, R11, R12, and R13 are pullup resistors for open impedance connections. Integrated circuit U2 is an inverter for the primary uplink SFP+ device open drain loss-of-signal (LOS) connection. Capacitors C16, C18, C20, and C21 and Ferrite beads FB6 and FB7 provide power supply filtering for the SFP+ device.

Figure 37:
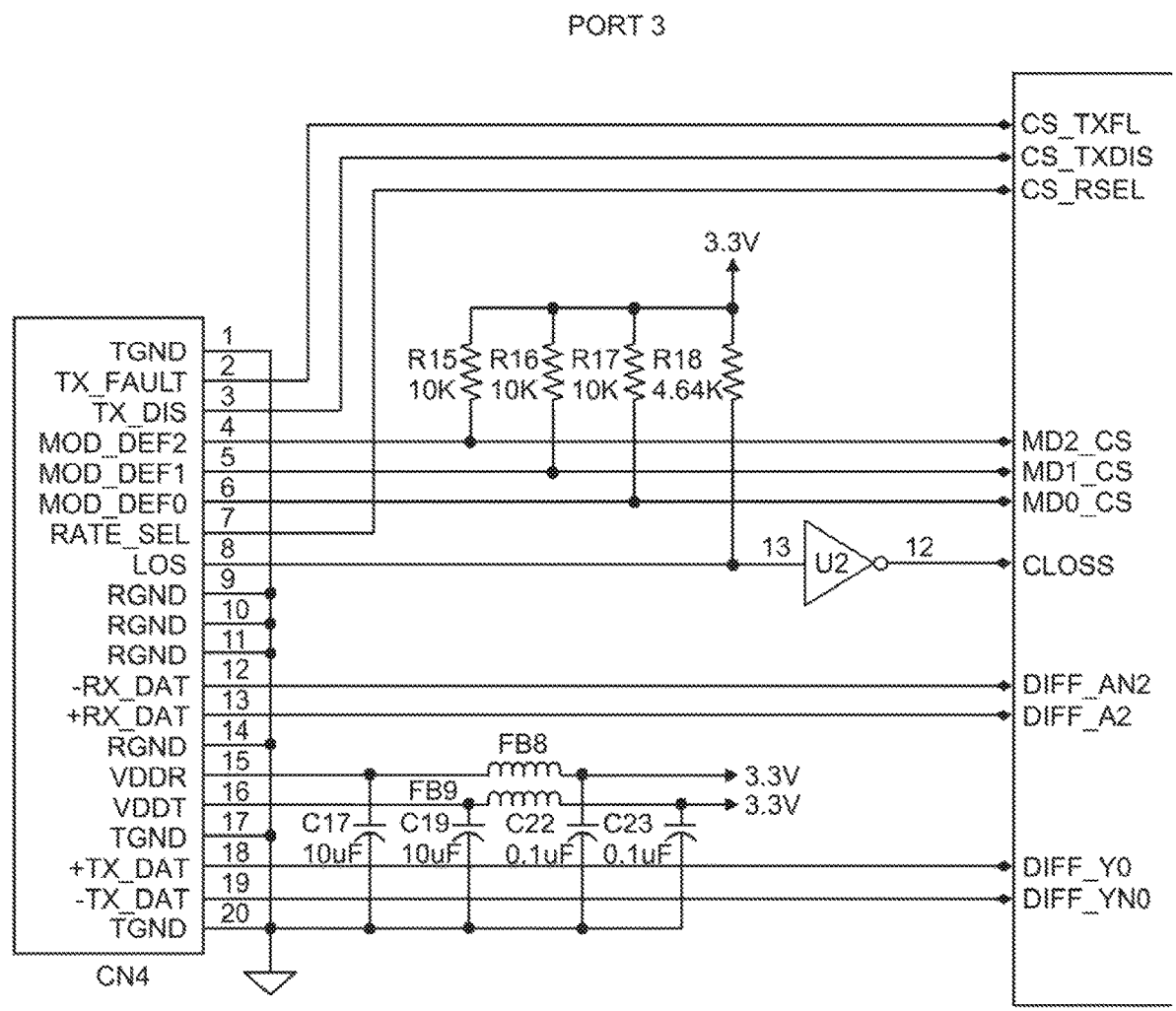
FIG. 37 is a circuit diagram of Port 3 (Secondary Downlink, Uplink Monitor/Inject, Uplink Cut-Thru) of the communication equipment of FIG. 34.

FIG. 37 is a circuit diagram of the primary uplink monitor, inject, and cut-thru, secondary port 3 (as illustrated in FIGS. 19-21 respectively), which is also the secondary downlink port for On-demand services (as illustrated in FIG. 25).

Connector CN4 accepts SFP+ pluggable devices, resistors R15, R16, R17, and R18 are pullup resistors for open impedance connections. Integrated circuit U2 is an inverter for the primary uplink SFP+ device open drain loss-of-signal (LOS) connection. Capacitors C17, C19, C22, and C23 and Ferrite beads FB8 and FB9 provide power supply filtering for the SFP+ device.

Figure 38:
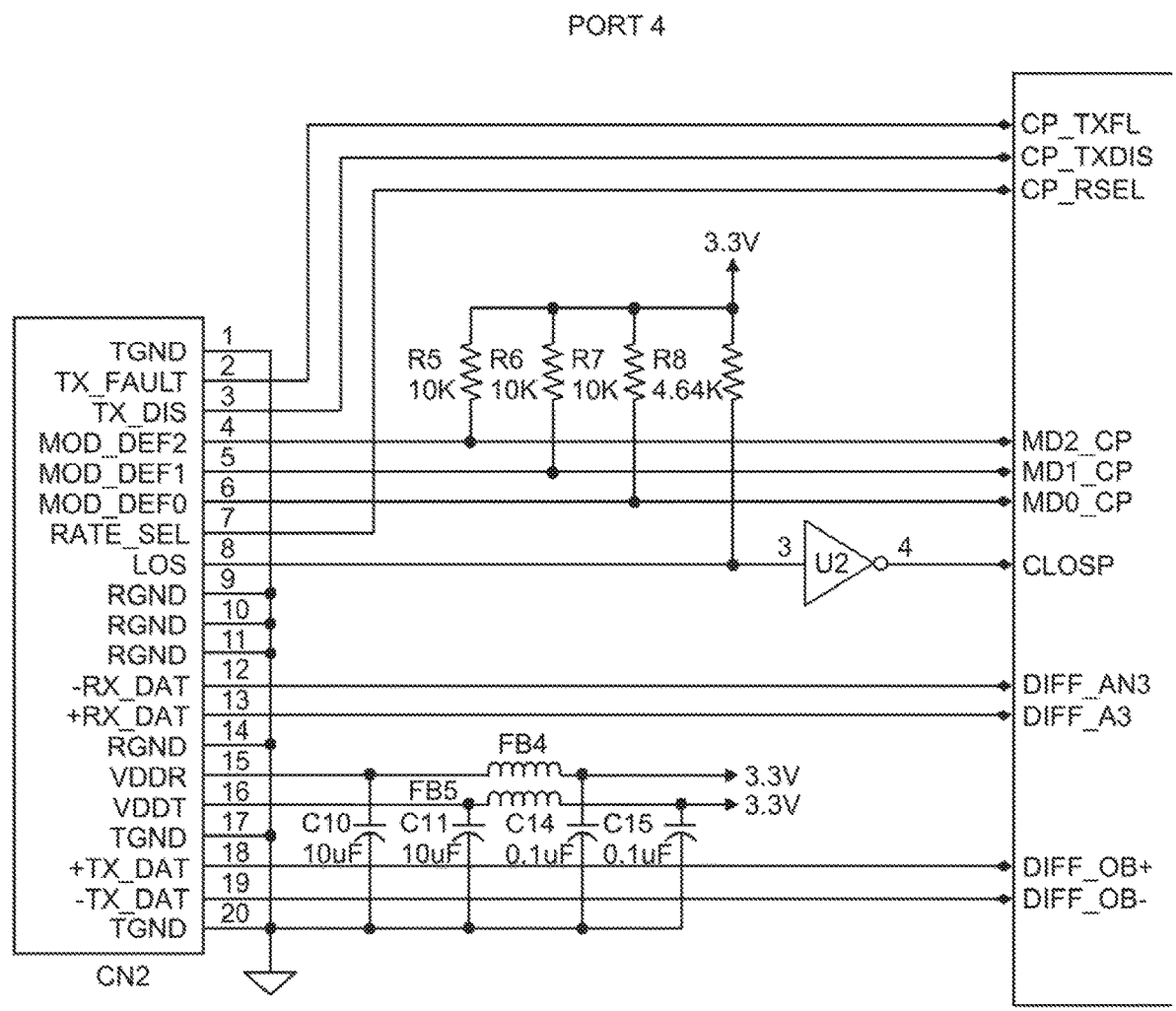
FIG. 38 is a circuit diagram of Port 4 (Primary Downlink) of the communication equipment of FIG. 34.

FIG. 38 is a circuit diagram of the primary downlink port 4. Connector CN2 accepts SFP+ pluggable devices, resistors R5, R6, R7, and R8 are pullup resistors for open impedance connections. Integrated circuit U2 is an inverter for the primary uplink SFP device open drain loss-of-signal (LOS) connection. Capacitors C10, C11, C14, and C15 and Ferrite beads FB4 and FB5 provide power supply filtering for the SFP+ device.

Figure 39:
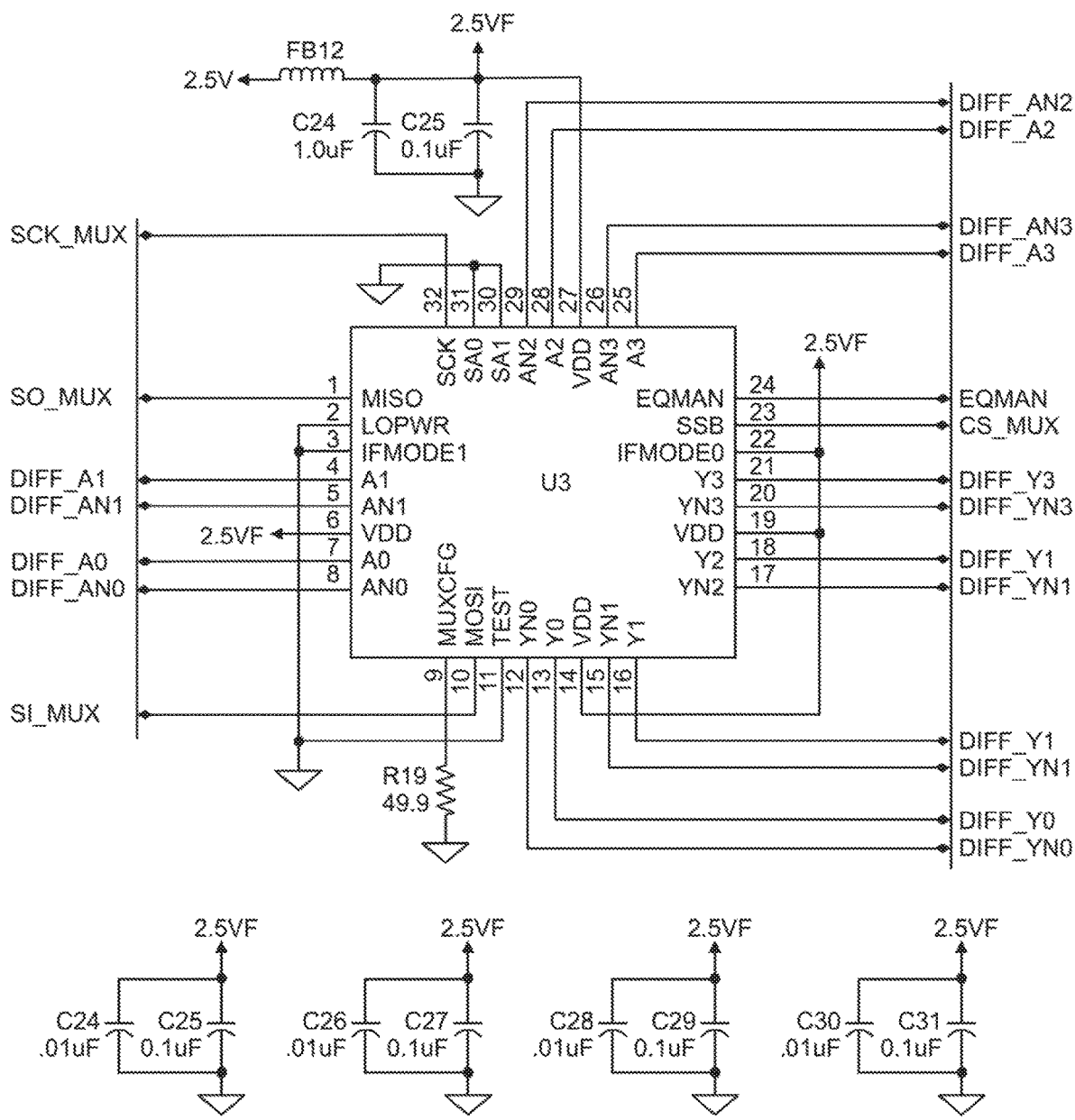
FIG. 39 is a circuit diagram of an integrated chip of the present disclosure functioning as a Multiplexer and Amplifier.

FIG. 39 is a circuit diagram of an integrated circuit U3 providing the input broadband amplifiers, output broadband amplifiers, and the 2-1 multiplex-demultiplexer circuitry. U3 is represented by a Microsemi VSC7111 11.5 Gbps Quad Signal Conditioner Mux/Demux or VSC7113 10.3 Gbps Quad Signal Conditioner Mux/Demux part. The VSC7111 and VSC7113 devices operate at a maximum frequency of 11.5 Gb/s and 10.3 Gb/s, respectively. The VSC7113 device is cost optimized for LAN 10G Ethernet services, whereas the VSC7111 device can also support WAN 10G Ethernet.

Figure 40:
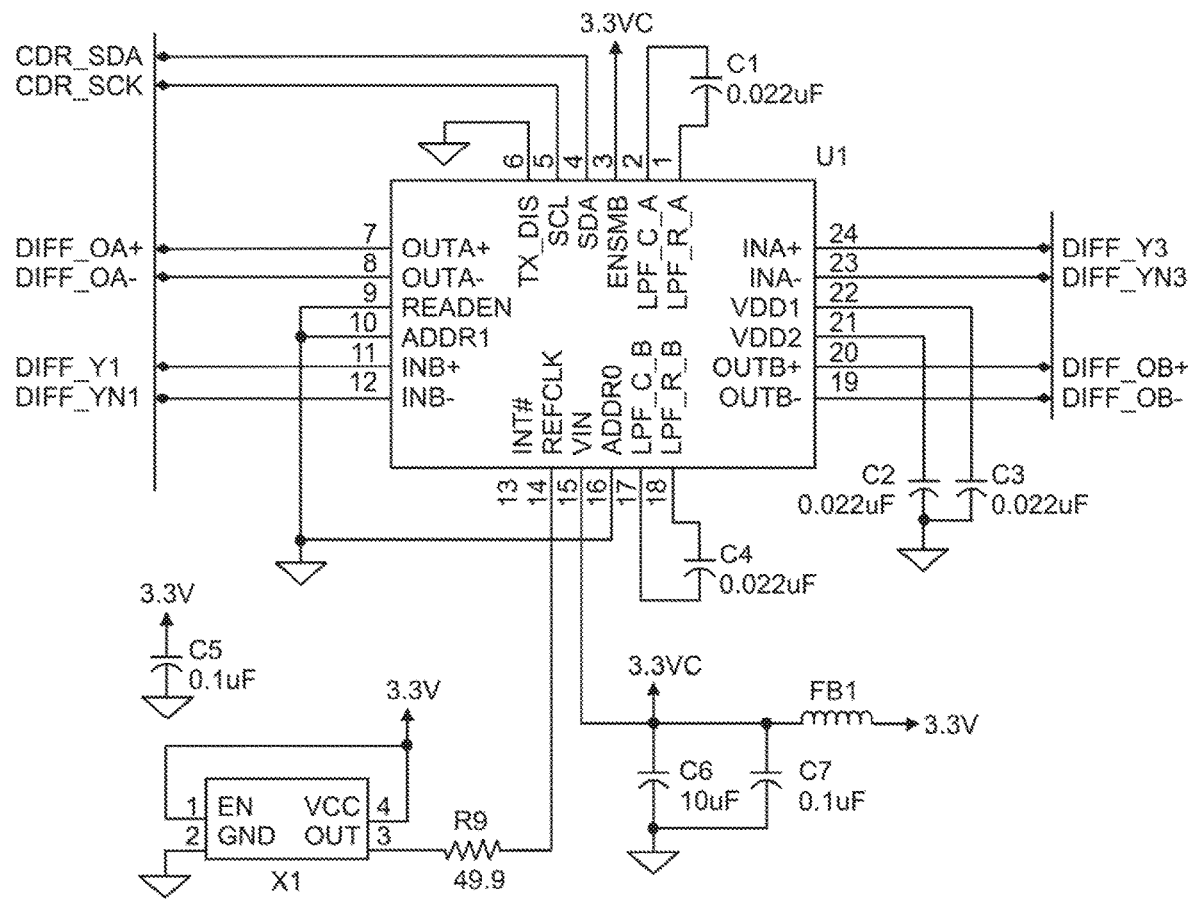
FIG. 40 is a circuit diagram of an integrated chip of the present disclosure functioning as a retimer.

FIG. 40 is a circuit diagram of the retimer circuitry, an integrated circuit U1. The retimer is required for customer applications requiring low jitter and to meet the requirements of SFF-8431 Enhanced Small Form Factor Pluggable Module SFP+, Revision 4.1, Jul. 6, 2009. U1 is represented by a Texas Instrument DS110DF111 Multi-Protocol 2-Channel 8.5-11.3 Gb/s Retimer or DS110DF125 Multi-Protocol 2-Channel 9.8-12.5 Gb/s Retimer part. A 25 MHz clock oscillator X1 provides a stable reference to the U1 device.

Figure 41:
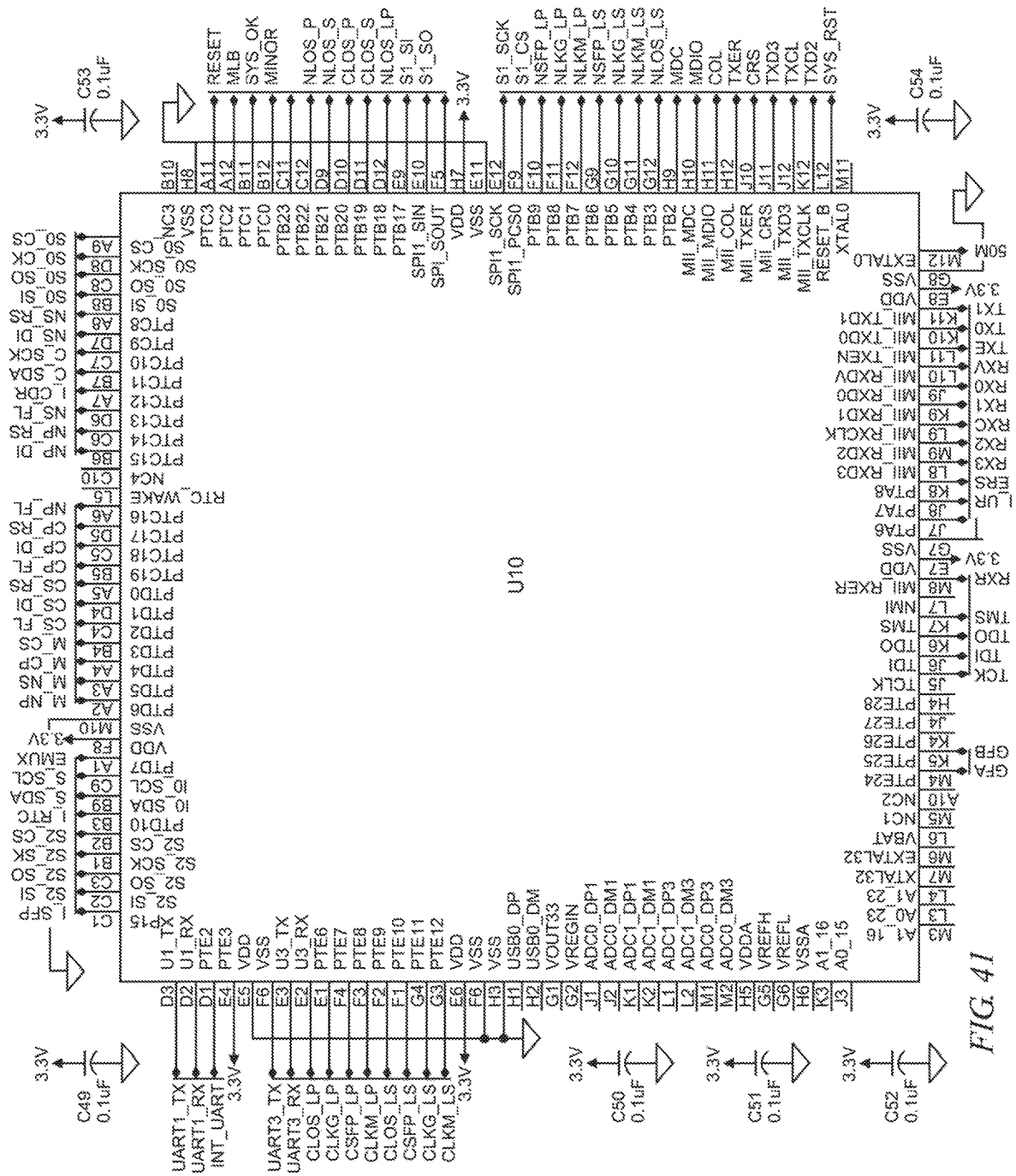
FIG. 41 is a circuit diagram of an integrated chip of the present disclosure functioning as a microprocessor of the communication equipment.

FIG. 41 is a circuit diagram of an integrated circuit U10 which will provide the communication, control, and management of the communication equipment. U10 is represented by a Qualcomm NXP Kinetis K66P144M180SF5V2 processor. The K66144M180F5V2 processor is a highly integrated processor with an ARM M4-Cortex processing core for multitasking. The K66144M180SF5V2 processor supports an Ethernet controller with MII and RMII interface to connect an Ethernet PHY for the remote management interface. The K66144M180SF5V2 processor supports two Universal Asynchronous Receiver Transmitter UARTs to connect a RS232 transceiver for the local craft interface and the controller port interface. For internal communications within the communication equipment, the K66144M180SF5V2 processor supports the Serial Peripheral Interface (SPI) and Inter-Integrated Circuit (I2C) modules. The K66144M180F5V2 processor has 1MB program flash memory and 256 kB of SRAM for storage and processing of equipment and service status and provisioning.

Figure 42:
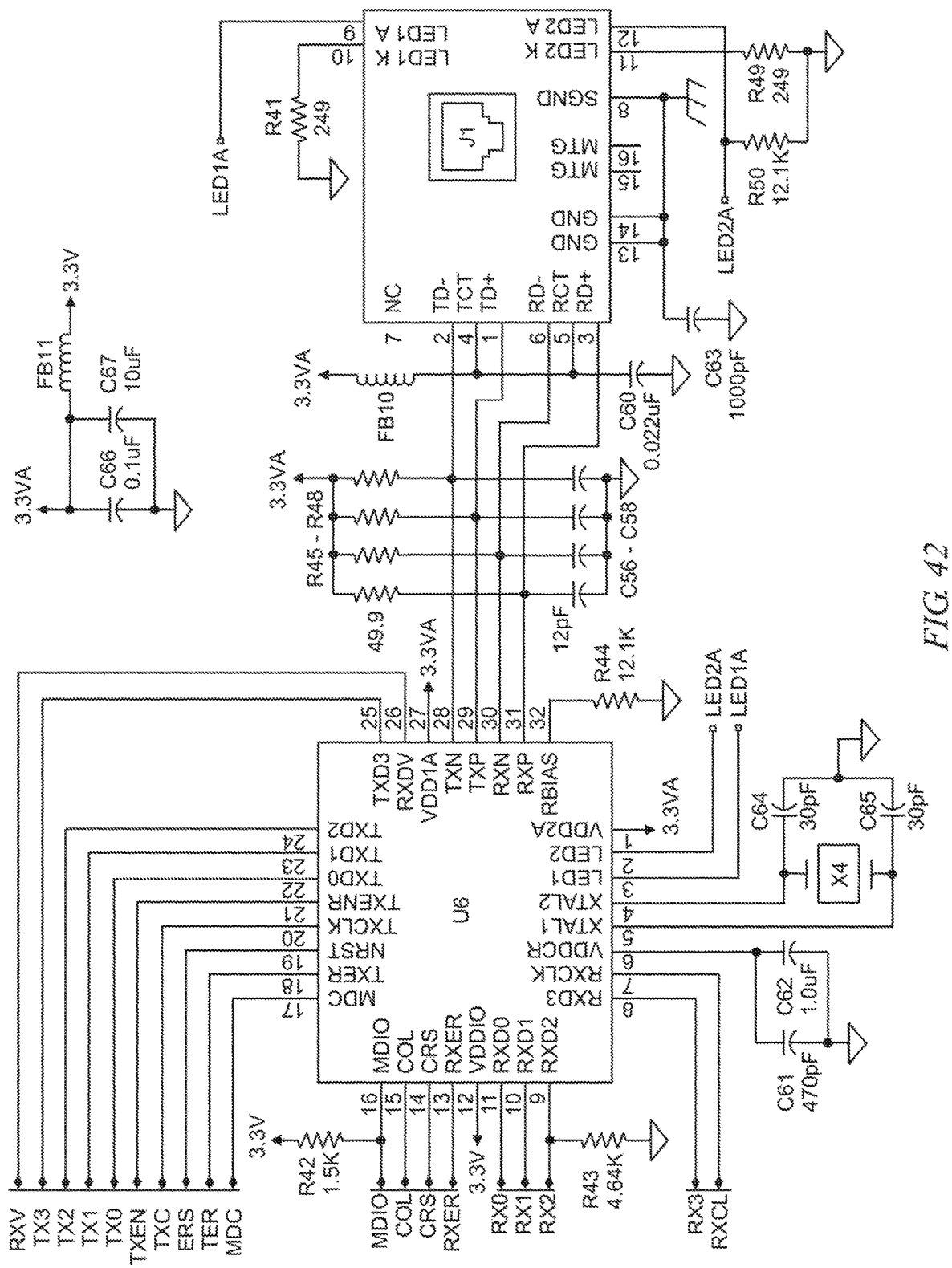
FIG. 42 is a circuit diagram of an integrated chip of the present disclosure functioning as an 10/100 Ethernet interface of the communication equipment.

FIG. 42 is a circuit diagram of the remote management interface, which provides an external remote connection for communication equipment and service status and provisioning. The remote management interface is an Ethernet 10/100BaseT connection. Integrated circuit U6 is an Ethernet 10/100BaseT physical interface (PHY) and J1 is an integrated RJ45 connector, which incorporated the RJ45 connector, transformer, passive termination, and LED status indicators. A 25 MHz crystal X4 is provided for the Ethernet device U6.

Figure 43:
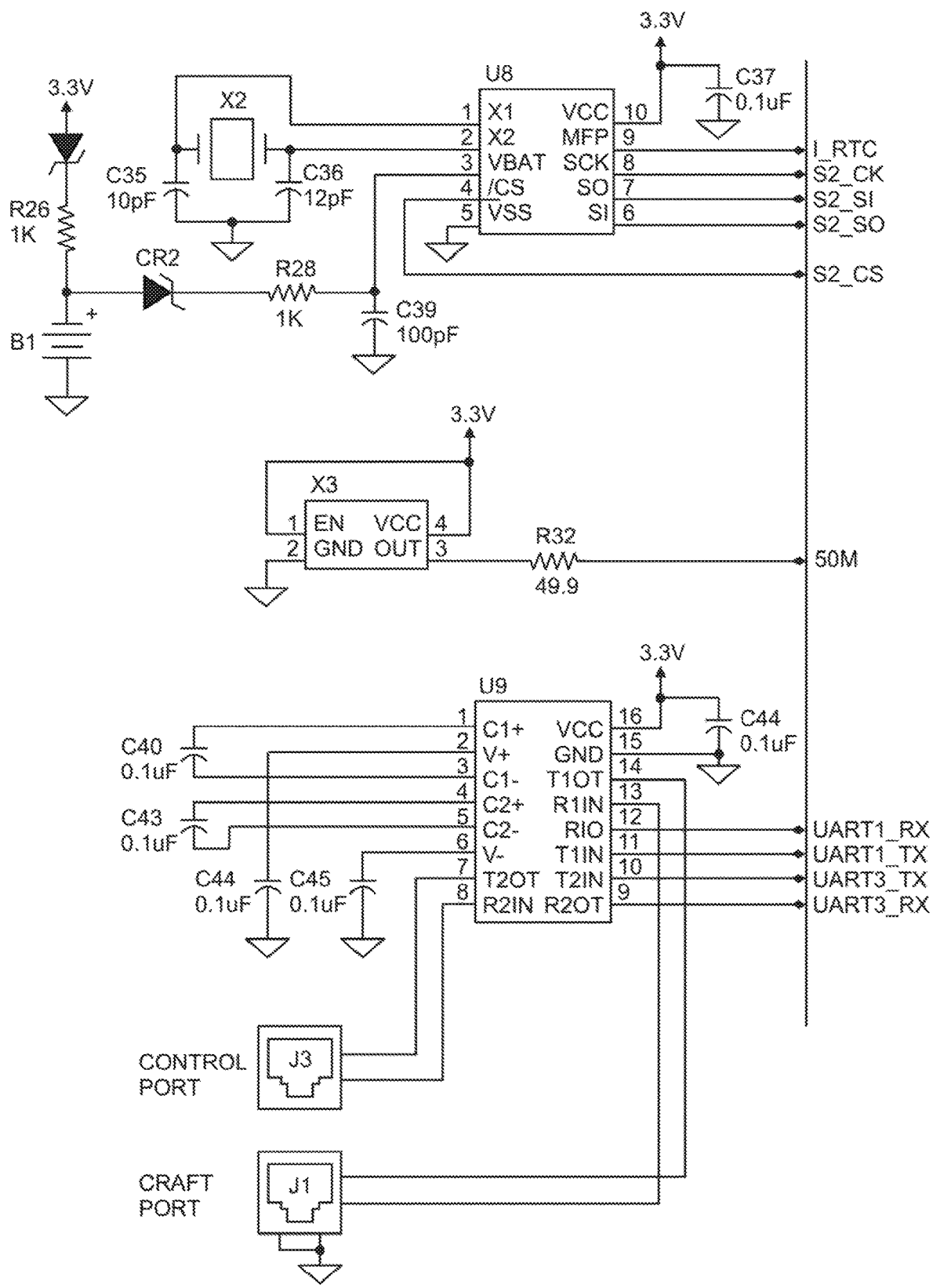
FIG. 43 is a circuit diagram of an integrated chip of the present disclosure functioning as clocking and RS232 interface of the communication equipment.

FIG. 43 is a circuit diagram of the real-time clock circuitry, the processor clock circuitry, and the craft port interface circuitry. The real-time clock provides timing and timing stamps for the communication equipment and communication service events. Integrated circuit U8 is represented by a Microchip MCP79510 real-time clock calendar with battery switchover. A 32.768 kHz crystal X2 is provided for timing reference for the MCP79510 device U8. Integrated circuit X3 is, a 50 MHz clock oscillator for the Kinetis K66P144M180SF5V2 processor U10. Integrated circuit U9 and connectors J1 and J3 provide the craft interface and controller module communication functionality. The craft interface provides an external local connection for communication equipment and service status and provisioning. U9 is represented by an Exar SP3232EEY Dual RS-232 Transceivers, J1 and J3 are represented by a standard RJ45 and RJ12 jack, respectively.

Figure 44:
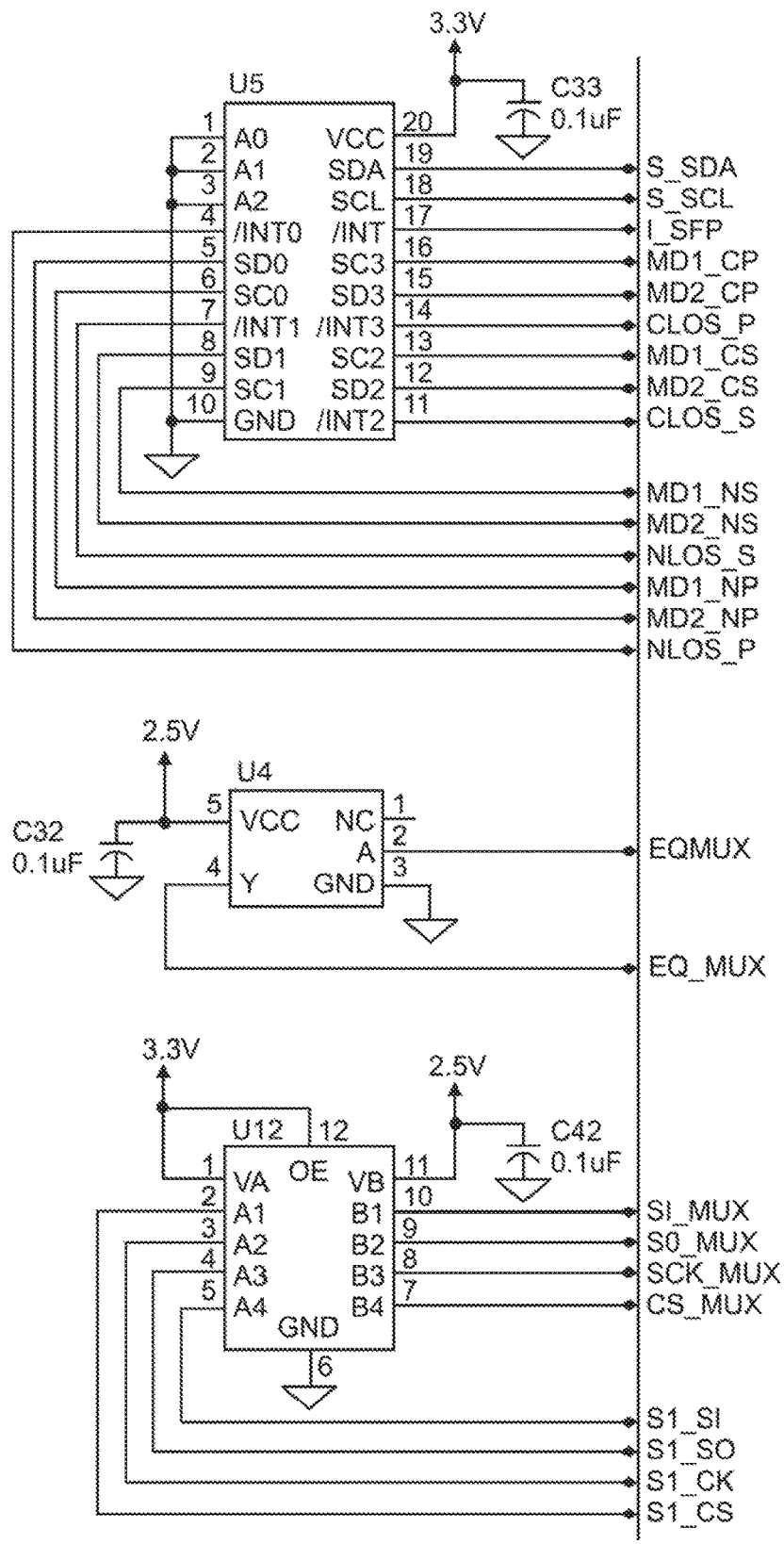
FIG. 44 is a circuit diagram of an integrated chip of the present disclosure functioning as integrated circuit drivers for the microprocessor.

FIG. 44 is a circuit diagram of integrated circuit drivers U4, U5, and U12, which the Kinetis K66P144M180SF5V2 processor U10 uses to communicate and control other integrated circuits. Integrated circuit U5 is represented by an NXP PCA9544 4-Channel I2C and SMBus Multiplexer. Using the NXP PCA9544 device U5, the Kinetis K66P144M180SF5V2 processor U10 can use a single I2C module to communicate to each of the four SFP ports. Integrated, circuit U4 is represented by a Texas Instrument (TI) SN74LV1T34 Single Power Supply Single Buffer Gate CMOS Logic Level Shifter. Using the TI SN74LV1T34 device U4, the Kinetis K66P144M180SF5V2 processor U10 3.3V GPIO lines can interface to the Microsemi VSC7111/7113 2.5V control line. Integrated circuit U12 is represented by a Texas Instrument (TI) TXB0304U 4-Bit Bidirectional Level-Shifter/Voltage Translator. Using the TI TXB0304U device U12, the Kinetis K66P144M180SF5V2 processor U10 33V SPI module can interface to the Microsemi VSC7111/7113 2.5V SPI module U3.

Figure 45:
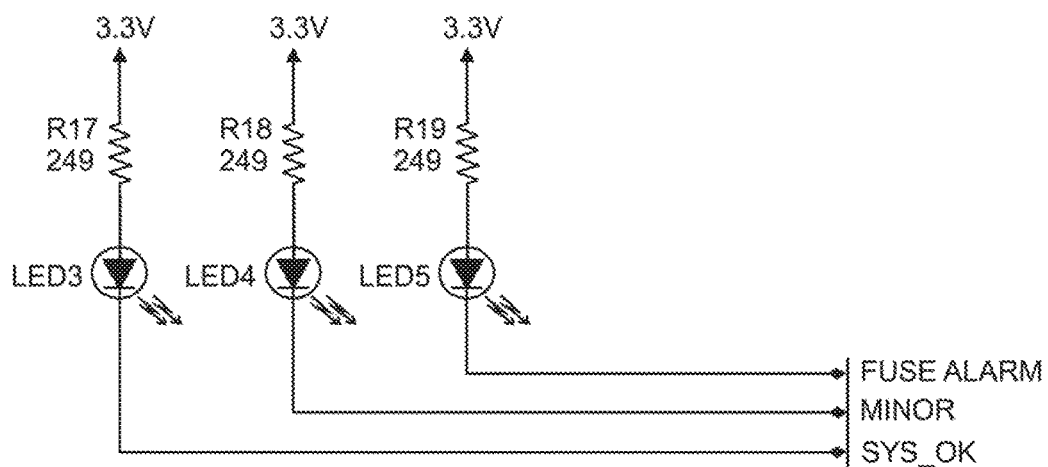
FIG. 45 is a circuit diagram of a first set of LED indicators of the communication equipment of the present disclosure.
Figure 45:
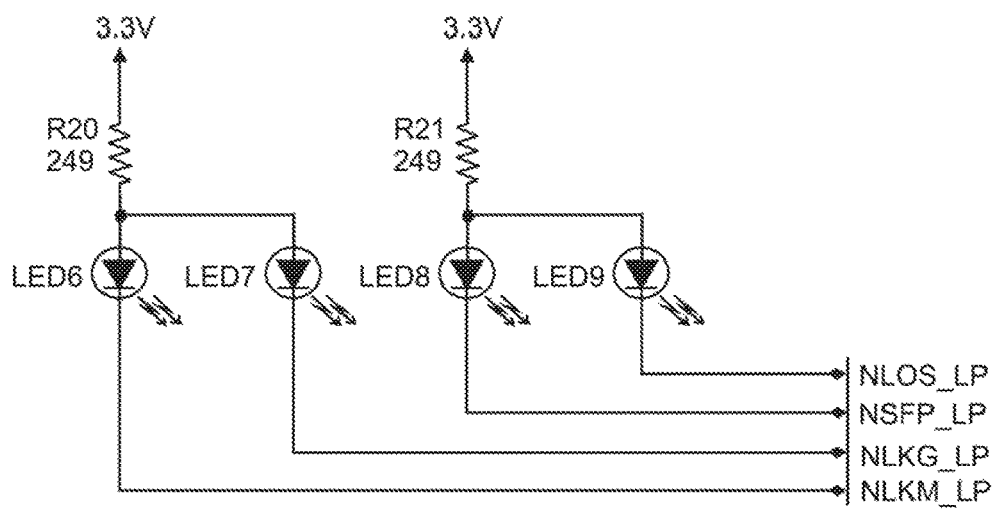
Figure 45:
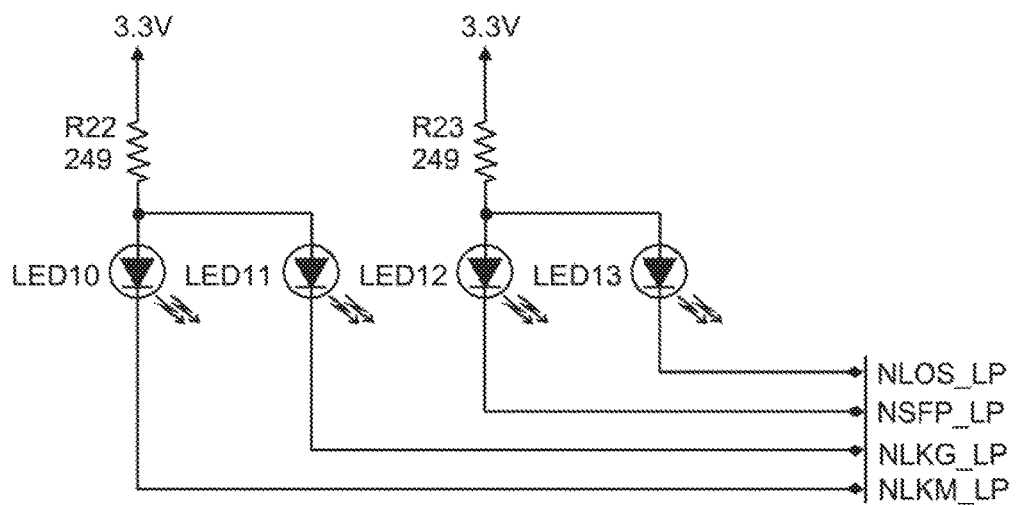
Figure 46:
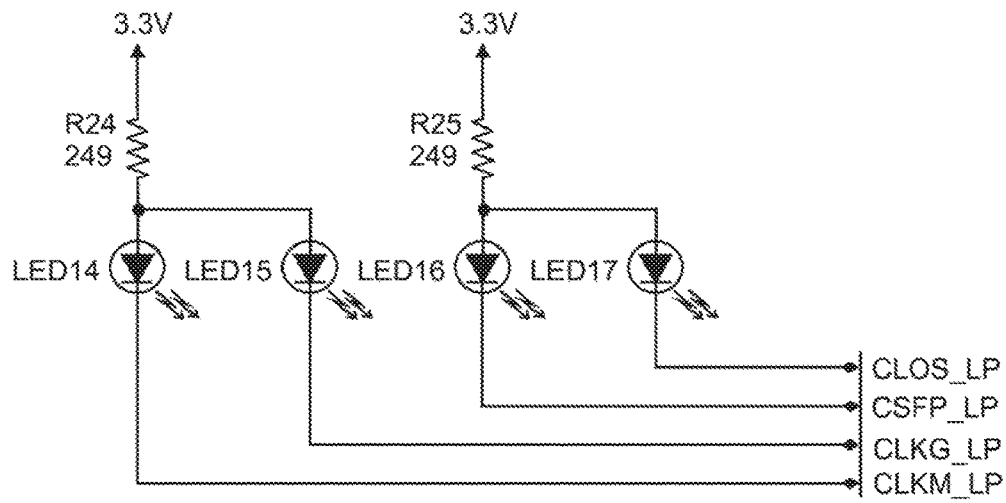
FIG. 46 is a circuit diagram of second set of LED indicators of the communication equipment of the present disclosure.
Figure 46:
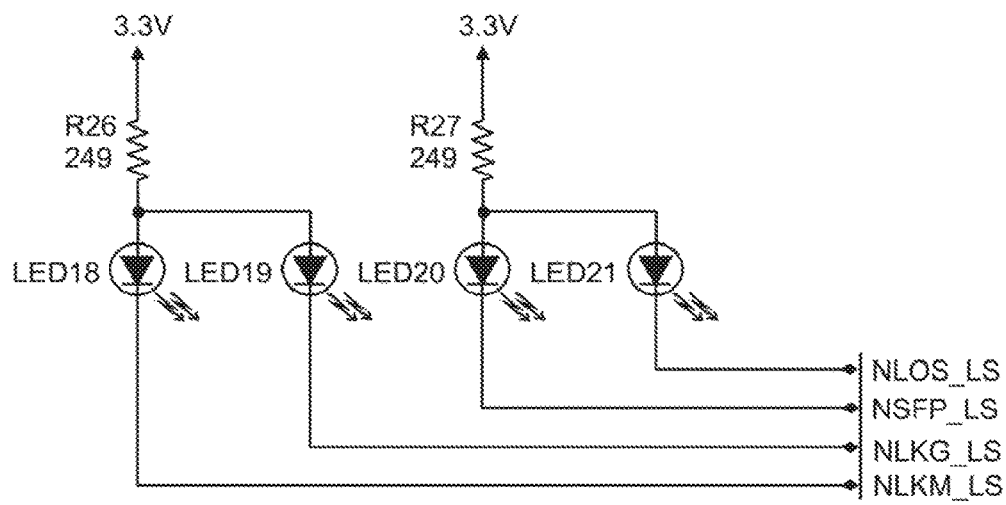
Figure 46:
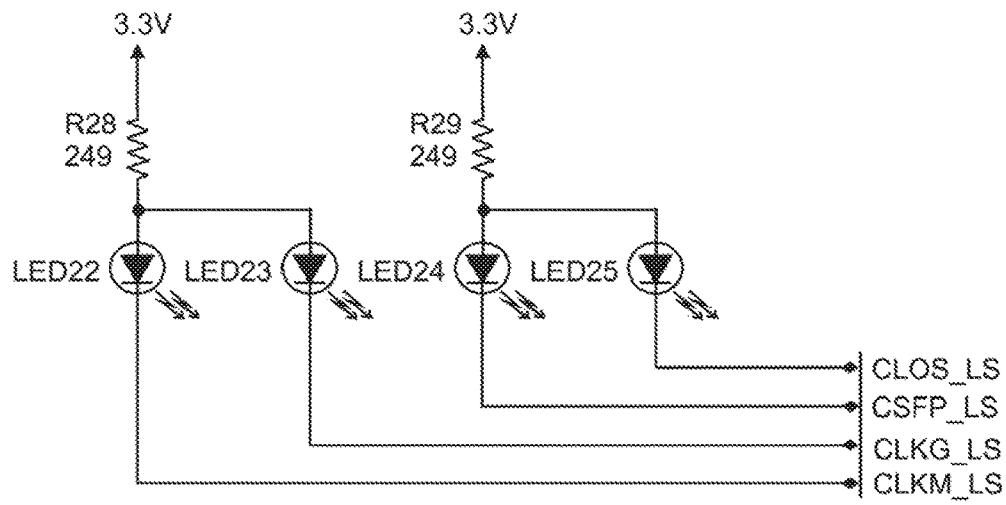

FIGS. 45 and 46 are circuit diagrams of visual indicators, light emitting diodes (LEDs). LEDs are used to convey visual status and provisioning indication on the communication equipment, communication service, and SFP devices. The Kinetis K66P144M180SF5V2 processor U10 controls the LEDs.

Figure 47:
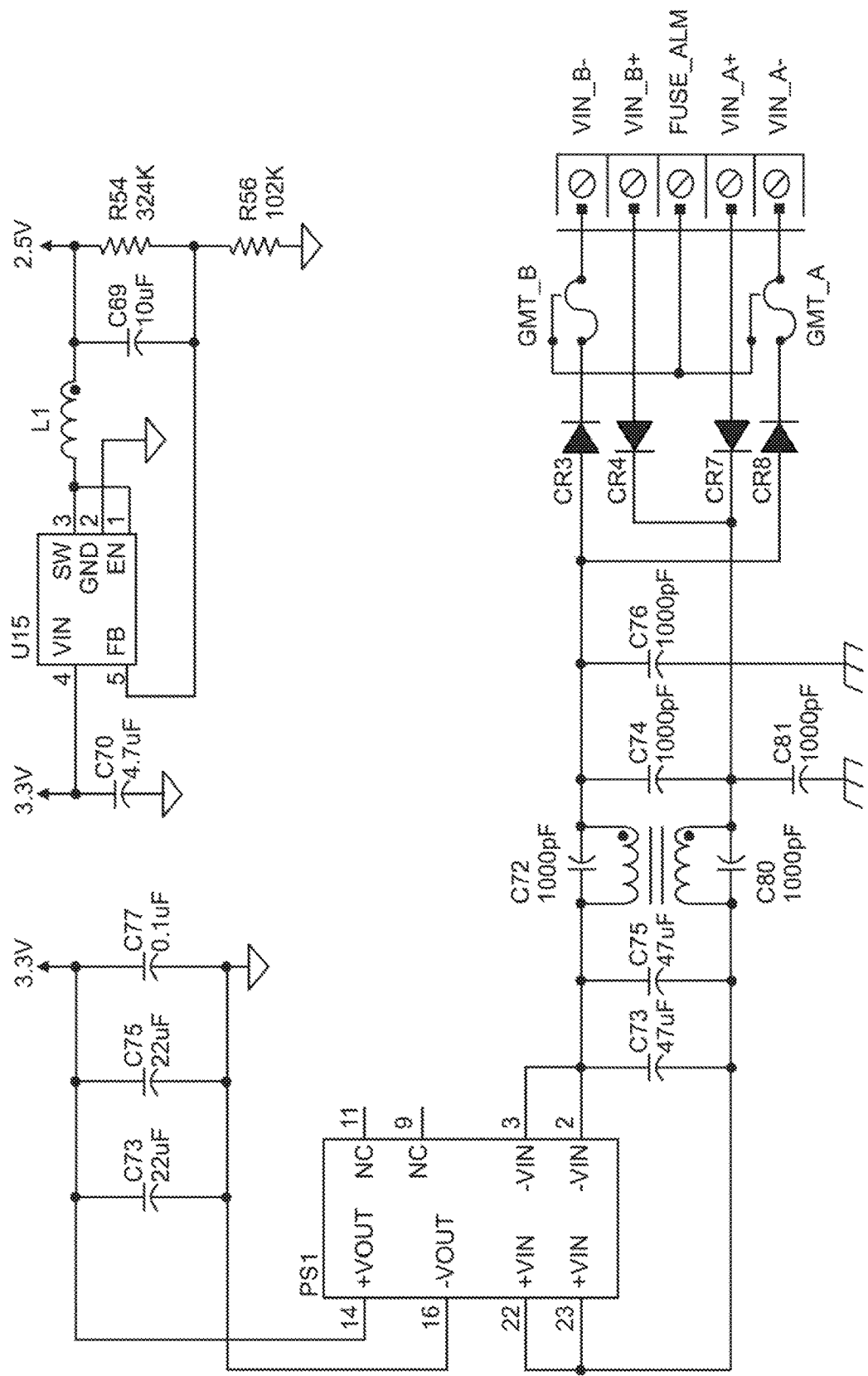
FIG. 47 is a circuit diagram of the power management of the communication equipment of the present disclosure.

FIG. 47 is a circuit diagram of the power management circuitry. Power supply PS1 is represented by a standard DIP24 power supply module 7-10 watts with a 4:1 wide power input 18-72 and a 3.3V output. A DC-DC buck converter U15 provides 2.5V for the Microsemi VSC7111/7113 U3 device. Standard diode rectifiers CR3, CR4, CR7, and CR8 provide A-B input DC power redundancy.

While the embodiment(s) disclosed herein are illustrative of the structure, function and operation of the exemplary method(s), circuitry, equipment and device(s), it should be understood that various modifications may be made thereto with departing from the teachings herein. Further, the components of the method(s), circuitry, equipment and device(s) disclosed herein can take any suitable form, including any suitable hardware, software, circuitry or other components capable of adequately performing their respective intended functions, as may be known in the art. It should also be understood that all commercially available parts identified herein can be interchanged with other similar commercially available parts capable of providing the same function and results.

While the foregoing discussion presents the teachings in an exemplary fashion with respect to the disclosed method(s), circuitry, equipment, and device(s) for communication services, it will be apparent to those skilled in the art that the present disclosure may apply to other method(s), system(s), device(s), equipment and circuitry for communication services. Further, while the foregoing, has described what are considered to be the best mode and/or other examples, it is understood that various modifications may be made therein and that the subject matter disclosed herein may be implemented in various forms and examples, and that the method(s), system(s), device(s), equipment and circuitry may be applied in numerous applications, only some of which have been described herein.

What is claimed is:

1. A system for communications networks, comprising:
a communications device having communication circuitry comprising:
a plurality of ports defining at least a first network port configured to transmit and receive communication service, and
a second network port configured to monitor the communication service and then inject the communication service or test signal;
a plurality of input differential amplifiers;
a plurality of multiplexer switchers or resistive dividers; and
a plurality output differential amplifiers;
wherein the circuitry defines a plurality of differential signal paths between the plurality of ports; and
a first Small Formfactor Pluggable (SFP) device in the first port, and a second SFP device in the second port;
wherein the plurality of multiplexer switches is selectively determinative of the differential signal paths between an input path of each SFP port connector and an output path of each of at least two other SFP port connectors through one input differential amplifier, and simultaneously two multiplexer switches and two output differential amplifiers.

2. The system of claim 1, wherein the first port defines a first path representing an input differential signal and a second path representing an output differential signal.

3. The system of claim 2, wherein the second port defines a third path representing an input differential signal and a fourth path representing an output differential signal.

4. The system of claim 3, wherein a third port defines a fifth path representing an output differential signal and a sixth path representing an input differential signal.

5. The system of claim 4, wherein a fourth port defines a seventh path representing an output differential signal and an eighth path representing an input differential signal.

6. The system of claim 1, wherein each differential amplifier includes a retimer.

7. The system of claim 1, wherein each of the plurality of ports are adapted to connect an SFP device.

8. The system of claim 1, wherein the circuitry is configured to interface media independent SFP devices providing interchangeable interfaces.

9. The system of claim 1, wherein the circuitry is adapted to provide at least one of service monitoring, service protection switching, redundancy, on-demand service, security, testing, troubleshooting and service upgrades.

10. A communication device, comprising:
a plurality of ports defining at least a first network Small Form-factor Pluggable (SFP) port configured to transmit and receive communication service, and a second network SFP port configured to monitor the communication service and then inject the communication, service or test signal; and
circuitry defining a plurality of differential signaling paths between the ports,
wherein the circuitry comprises a plurality output differential amplifiers, a plurality of multiplexer switchers or resistive dividers, and a plurality output differential amplifiers;
wherein the plurality of multiplexer switches is selectively determinative of the differential signal paths between an input path of each SFP pot connector and an output path of each of at least two other SFP port connectors through one input differential amplifier, and simultaneously two multiplexer switches and two output differential amplifiers;
wherein the plurality of differential signaling paths provide at least one of service monitoring, service protection, switching, redundancy, on-demand service, security, testing, troubleshooting and service upgrades.

11. The device of claim 10, wherein the first port defines a first path representing an input differential signal and a second path representing an output deferential signal.

12. The device of claim 11, wherein the second port defines a third path representing an input differential signal and a fourth path representing an output differential signal.

13. The device of claim 12, wherein a third port defines a fifth path representing an output differential signal and a sixth path representing an input differential signal.

14. The device of claim 13, wherein a fourth port defines a seventh path representing an output differential signal and an eight path representing an input differential signal.

15. The device of claim 10, wherein each of the plurality of ports are SFP ports.

16. The device of claim 10, wherein each differential amplifier includes a retimer.

17. The device of claim 10, further comprising a processor, timing LED indicators, a status and provisioning interface, and power management.

18. The device of claim 10, wherein the device is one of monitoring equipment, a network interface device, a router and an Ethernet switch.

19. A method of providing media independent, multifunctional services in communication equipment, comprising the steps of:
providing a plurality of Small Form-factor Pluggable (SFP) ports defining at least a first network SFP port configured to transmit and receive communication service, and a second network SFP port configured to monitor the communication service and then inject the communication service or test signal;
providing circuitry defining a plurality of differential signaling paths between the ports, the circuitry comprising a plurality of input differential amplifiers, a plurality of multiplexer switchers, and a plurality output differential amplifiers;
providing at least one of service monitoring, service protection switching, redundancy, on-demand service, security, testing, troubleshooting and service upgrades via the plurality of differential signaling paths;
selectively determining the differential signal paths between an input path of each SFP port connector and an output path of each of at least two other SFP port connectors through one input differential amplifier, and simultaneously two multiplexer switches and two output differential amplifiers.

20. The method of claim 19, wherein the communication equipment performs service monitoring by duplicating a communication service differential signal without altering the differential signal to logic signals for the purpose of monitoring.

* * * * *